United States Patent
Kim et al.

(10) Patent No.: US 8,914,404 B1
(45) Date of Patent: Dec. 16, 2014

(54) TECHNIQUES FOR PERFORMING VIEW INDICATION MANAGEMENT

(75) Inventors: Ken Kim, Worcester, MA (US); Yong Wang, Westborough, MA (US); Lorenzo Bailey, Framingham, MA (US); Utkarsh Vipul, Manfield, MA (US); Muhamad Djunaedi, Northborough, MA (US); Xuan Tang, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 675 days.

(21) Appl. No.: 13/065,738

(22) Filed: Mar. 29, 2011

(51) Int. Cl.
*G06F 7/00* (2006.01)
*G06F 17/30* (2006.01)

(52) U.S. Cl.
USPC .......................................... 707/769; 707/717

(58) Field of Classification Search
None
See application file for complete search history.

(56) References Cited

U.S. PATENT DOCUMENTS

| | | | | |
|---|---|---|---|---|
| 5,276,870 A | * | 1/1994 | Shan et al. | 1/1 |
| 5,333,316 A | * | 7/1994 | Champagne et al. | 707/999.008 |
| 7,647,595 B2 | * | 1/2010 | Chandrasekaran | 719/318 |
| 2003/0058277 A1 | * | 3/2003 | Bowman-Amuah | 345/765 |
| 2008/0243807 A1 | * | 10/2008 | Gaucas et al. | 707/5 |
| 2010/0325531 A1 | * | 12/2010 | Petronijevic et al. | 715/234 |
| 2012/0117105 A1 | * | 5/2012 | Thomas et al. | 707/769 |
| 2012/0117462 A1 | * | 5/2012 | Jacobson et al. | 715/249 |
| 2012/0143917 A1 | * | 6/2012 | Prabaker et al. | 707/784 |

FOREIGN PATENT DOCUMENTS

WO WO 9905619 A1 * 2/1999 ............ 719/318

OTHER PUBLICATIONS

Ken Kim, et al., "Techniques for Mapping Data Models Using an Intermediate Processing Layer", U.S. Appl. No. 13/065,735, filed Mar. 29, 2011.

* cited by examiner

*Primary Examiner* — Uyen Le
(74) *Attorney, Agent, or Firm* — Muirhead and Saturnelli, LLC

(57) ABSTRACT

Described are techniques for providing notifications. A client registers a subscription request for a view to provide a notification to the client responsive to a data change affecting the view. The view is generated using one or more commands operating on data included in a database. A first operation is performed to the database. It is determined whether the first operation causes a data change affecting the view. Responsive to determining the first operation causes a data change affecting the view, a notification is sent to the client. The view is updated in response to receiving the notification.

16 Claims, 15 Drawing Sheets

TECHNIQUES FOR PERFORMING VIEW INDICATION MANAGEMENT

BACKGROUND

1. Technical Field

This application relates to techniques used in connection with indication management in a system.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with data storage systems, or more generally any type of system, a subscriber may register to receive notifications regarding the occurrence of events in the system. Upon the occurrence of an event for which the subscriber is registered, a notification is sent to the subscriber.

SUMMARY OF THE INVENTION

In accordance with one aspect of the invention is a method for providing notifications comprising: registering, by a client, a subscription request for a view to provide a notification to the client responsive to a data change affecting the view, wherein the view is generated using one or more commands operating on data included in a database; performing a first operation to the database; determining whether the first operation causes a data change affecting the view; sending, responsive to determining the first operation causes a data change affecting the view, a notification to the client; and updating the view in response to receiving the notification. The view may be accessible as a virtual table computed using one or more database tables of the database. The one or more commands may be database query commands which extract data from the one or more database tables. Each of the one or more database tables may correspond to a class of object instances, each row of said each table includes data for one of said object instances, and said each row includes property or attribute values for said one object instance. The first operation may be a command to perform any of an update operation to update an existing row of a first of the one of the database tables, a new operation to add a new row to the first database table and a delete operation to delete an existing row of the first database table. The subscription request may include criteria to register to receive a notification in response to an occurrence of any of a deletion of an existing row from the virtual table representing the view, an update of one or more data items included in an existing row from the virtual table representing the view, and a new operation causing an addition of a new row to the virtual table representing the view. The criteria may indicate to register to receive a notification in response to any of an occurrence of a deletion of a row from the virtual table of the view and a new operation to add a new row of data to the virtual table of the view, and the method may include: determining that the first database table includes data upon which said view is dependent; setting one or more database triggers for the first database table, said one or more database triggers providing for notification to a first software component upon an occurrence of any of a new operation to insert a new row in the first database table, a delete operation to delete an existing row from the database table, and an update operation to update a column of the first database table, wherein a primary key of the virtual table of the view is dependent upon the column; and caching a first set of one or more values for the primary key, said first set of one or more values corresponding to current values of the primary key included in the virtual table of the view. The criteria may indicate to register to receive a notification in response to an occurrence of a new operation to add a new row of data to the virtual table, and the method may include: receiving a database trigger notification that a new row having a first row identifier has been added to the first database table; determining that the view has a data dependency on data of the new row; performing a query based on at least a first of said one or more database query commands with additional query criteria to retrieve data of the first database table matching said first row identifier, said query returning first results; determining whether the first results includes a first value that does not match one of the values of the first set previously cached; and if the first results includes the first value that does not match one of the values of the first set, sending a new notification to the client and updating a cache to include the first value. The criteria may indicate to register to receive a notification in response to an occurrence of a delete operation to delete an existing row of data from the virtual table, and the method may include: receiving a database trigger notification that a first row having a first row identifier has been deleted from the first database table; determining that the view has a data dependency on data of the first row that has been deleted; performing a query based on at least a first of said one or more database query commands to return first results including a list of one or more current values of the primary key of the virtual table of the view; comparing the list to the first set previously cached; and for each value included in the first set which does not have a match in the list, sending a deletion notification to the client and updating a cache to remove said each value. The criteria may indicate to register to receive a notification in response to an occurrence of an update or change operation to update any existing data included in a first column of the virtual table of the view, wherein the first column corresponds to an object property of interest, and the method may include: determining that the first database table includes data upon which said view is dependent; determining a second column of the first database table, wherein the first column of the virtual table of the view corresponds to or otherwise depends upon the second column; setting one or more database triggers for the first database table, said one or more database triggers providing for notification to a first software component upon an occurrence of any of an insert operation to insert a new row in the first database table, a delete operation to delete an existing row from the database table, an update operation to update the second column of the first database table, and an update operation to update a column of the first database table, wherein a primary key of the virtual table of the view depends on the column; caching a first set of one or more values for the primary key of the virtual table of the view, said first set of one or more values corresponding to current values of the primary key included in the virtual table of the view; and caching a second set of one or more values of the first column of the virtual table, said second set of one or more values corresponding to current values included in the first column of the virtual table, each value in said second set having a corresponding value in said first set. The method may also include receiving a database trigger notification that a first database operation has been performed to update existing data of a first row having a first row identifier from the first database table; determining that the view has a data dependency on data of the first row; performing a query based on at least a first of said one or more database query commands with additional query criteria to retrieve data of the first database table matching said first row identifier, said query returning first results corresponding to a second row of the virtual table dependent on the first database operation performed, said first results including a first primary key value for the primary key of the virtual table and a first property value of the object property of interest; comparing the first results to the first set and the second set to determine if there has been a change to any one or more values of the object property of interest; and for each value included in the second set that is associated with a corresponding value in the first set and that is identified as having changed by said comparing, sending a change notification to the client and updating a cache to include an updated data value for said each value. The view may be updated using information returned in the notification. The one or more commands may include at least one command which aggregates first data from the one or more database tables and includes in the view one or more data items in accordance with the aggregated first data. The first data may include a mathematical calculation using a plurality of data items from the one or more database tables. The one or more commands may include at least one command which joins data from multiple database tables to form a row of the virtual table of the view.

In accordance with another aspect of the invention is a computer readable medium comprising code stored thereon for providing notifications, the computer readable medium comprising code for: registering, by a client, a subscription request for a view to provide a notification to the client responsive to a data change affecting the view, wherein the view is generated using one or more commands operating on data included in a database; performing a first operation to the database; determining whether the first operation causes a data change affecting the view; sending, responsive to determining the first operation causes a data change affecting the view, a notification to the client; and updating the view in response to receiving the notification. The view may be accessible as a virtual table computed using one or more database tables of the database. The one or more commands may be database query commands which extract data from the one or more database tables. Each of the one or more database tables may correspond to a class of object instances, each row of said each table includes data for one of said object instances, and said each row may include property or attribute values for said one object instance. The first operation may be a command to perform any of an update operation to update an existing row of a first of the one of the database tables, a new operation to add a new row to the first database table and a delete operation to delete an existing row of the first database table.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
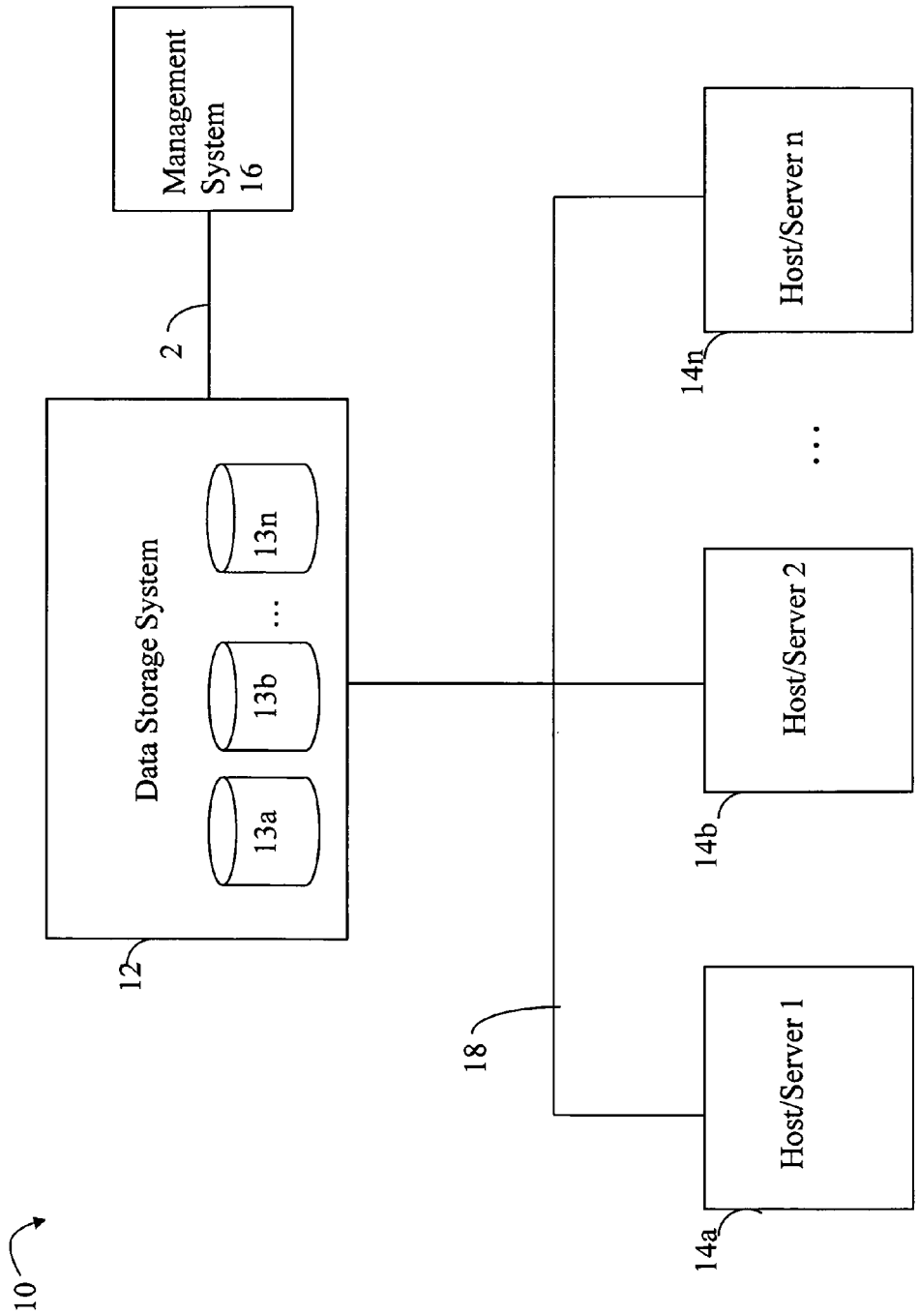
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or Fibre Channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel Connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
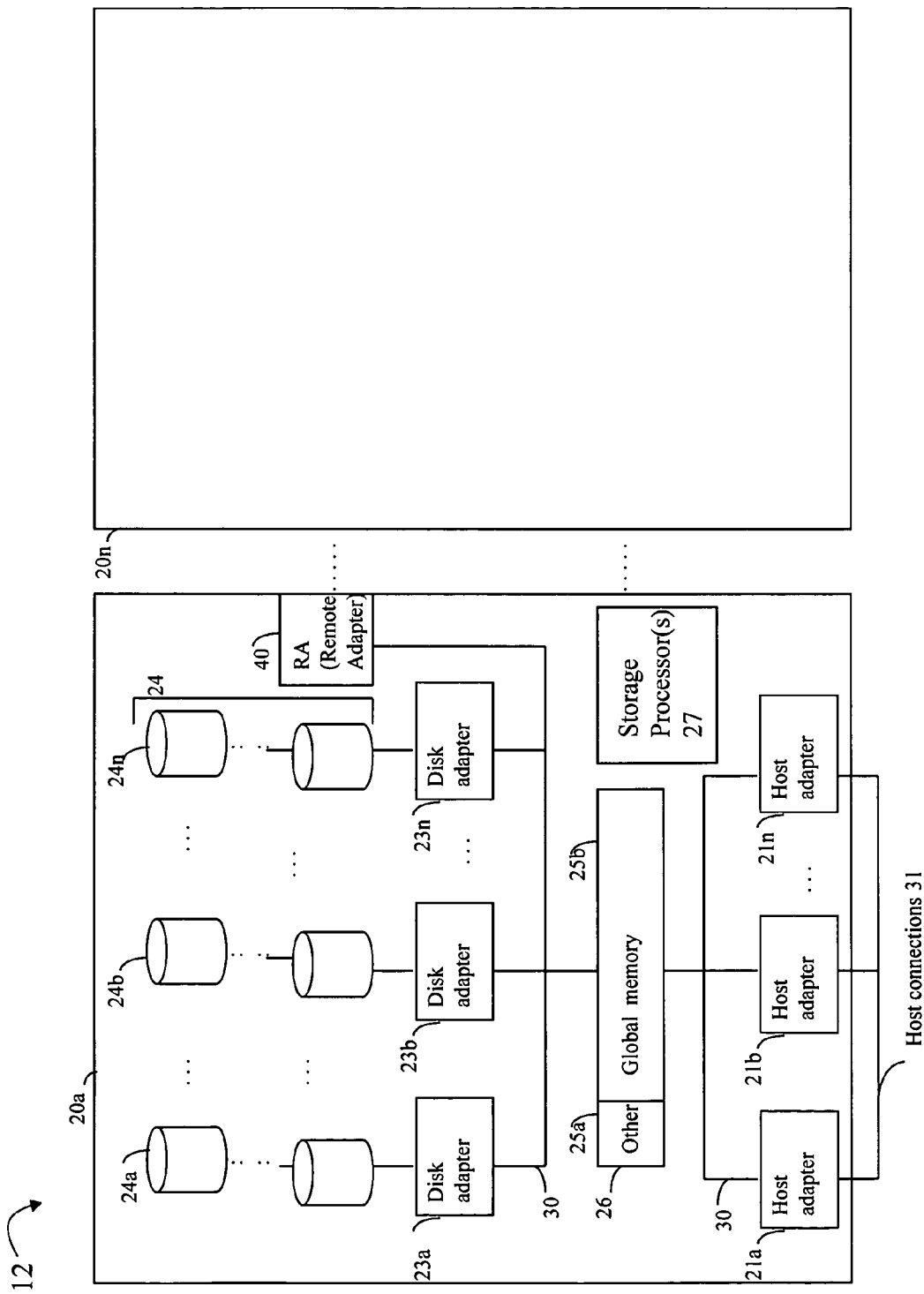
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the CLARiiON® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

In connection with techniques herein, the management system 16 may issue a request to the data storage system such as illustrated in FIG. 1. The request may be to provide a logical system configuration view regarding components of the data storage system, the state of such components, and the like. In response to receiving the client request, the data storage system may provide the requested information to the client. As described in more detail below, at various points in time, the data storage system may continually collect the configuration information regarding its current configuration. The data storage system may store the configuration information in database tables. In response to the client request, the data provided to the client may be based on a database view or virtual table generated from the database tables at the time the client request is received and processed. For example, the data provided to the client may be generated by executing one or more commands performing a database query of the database tables. The result of the query may be the view or virtual table provided to the client. During the time the client session is active, the data storage system may receive one or more updates to its configuration information stored in the database tables. In response to updates to the database tables, it may be desirable to appropriately provide any updates to the virtual entity, the view, as used by the client since changes made to the database tables may also affect data of the view. Described in following paragraphs are techniques that may be used in connection with providing indications or notifications to the client regarding any data changes affecting the view as used by the client. The techniques provide a mechanism for tracking mappings and/or dependencies between the database tables and the view (e.g., virtual table described in more detail below). When an operation is performed to modify a database table, such mappings may be used to determine the affected views, if any. The mappings may be used to calculate the view changes based on changes to the underlying database tables. Indications may then be generated for the views based on the view changes. In connection with the foregoing, a subscription request may be generated for the client view to register to receive notifications regarding data changes affecting the view. An embodiment may only track changes for those data elements included in registered subscription requests to thereby further increase the efficiency of indication processing in accordance with techniques herein. It should be noted that although the techniques herein may be illustrated in the context, for example, of providing data storage configuration information, the techniques herein may be used more generally in providing any type of data to a client where such data is included in a view or virtual table as may be generated using database queries applied to one or more database tables of a database.

The techniques herein may be used with an object-based model Both the client's view (virtual table) and the database tables may be object-based model although both may use a different object model thereby requiring mapping between dependencies of the object model used by the client and the database object model. The object model used or consumable by the client may be referred to as the client data model. Thus, the view or virtual table used by the client may be characterized as being in accordance with the client data model generated using database tables in accordance with the database model. In the embodiment described herein, both the client data model and the database model may be different object-based models where the client uses a virtual table or view generated from database tables. In such an embodiment using object-based models, a row in a database table or virtual table may correspond to an object instance and each column in the table may correspond to an attribute or property of the object. The object may correspond to, and represent the state of, a physical or logical entity in the data storage system. For example, depending on the model, an object may represent a physical component such as a fan, power supply, port, logical storage device, or physical storage device. The physical and/or logical component may be characterized by state information represented as properties or attributes of an object. For example, an object corresponding to a physical storage device may have attributes representing the total available storage capacity, an amount of unused or free storage capacity, physical device characteristics, and the like. An object may also represent a logical entity such as a RAID group, LUN or LV, storage group of one or more LUNs, and the like. A logical entity such as a RAID group may be represented by an object having attributes such as indicating a RAID level of the RAID group (e.g., RAID-0, 1, 5, or 6), a number of data and/or parity drives, and the like.

As mentioned above, the client may use data of a view. In connection with databases, a view may be generated based on a stored database query. The view may be accessible as a virtual table including the result set of the query. In contrast to ordinary database tables, a view may be characterized as a dynamic virtual table computed or collated from the database tables. Therefore, changing first data of a database table upon which second data of a view is dependent thereby may also cause changes to the view or virtual table. Views may represent, for example, a subset of data included in one or more database tables. Views may also join and simplify multiple database tables into a single virtual table, aggregate data from one or more database tables, and the like. For example, a view may include a property of an object which is based on a calculation performed using multiple values from one or more objects of one or more database tables (e.g., sum, average). As another example, a view or virtual table may include an object which is the result of combining rows of multiple database tables.

In an embodiment in accordance with techniques herein to provide indications or notifications to the client in response to data changes affecting a view used by the client, the client may register or subscribe to receive notifications for changes affecting the view (e.g. indicating that the view needs to be modified such as by adding a new row of information to the view, deleting an existing row from the view, or updating one or more data elements of an existing row of the view). Described in following paragraphs are techniques that may be used in an embodiment in connection with view indication management. The techniques herein provide for selective data processing and tracking of indications for a view for which a client is registered. An embodiment described in following paragraphs may use an object-based model although other embodiments in accordance with techniques herein may use different types of data model(s). In such an embodiment using an object-based model, registration and notification for a view may be performed with respect to objects, an attribute or property of an object, and/or a class of objects as in the client data model used by the view or virtual table. Clients may register to receive indication notifications regarding any one or more type of events regarding the objects of a view. A client may register to receive notification regarding different levels and/or categories of changes as related to the view. For example, with respect to a view used by a client, the client may register to receive notifications regarding changes to any object, changes to one or more specified objects (e.g., changes to any attribute of the specified objects), changes to one or more specified attributes of an object, when any new object is created, when any object is deleted, and the like. A client may also register to receive class-level indications such as with respect to a class of objects in the client data model as used by client views. For example, a client may register to receive notification when a new object in a specified class is created, when an object in a specified class is deleted, when there is any change to an attribute of an object of a specified class, and the like. The foregoing, as well as other criteria, may be used in connection with client subscriptions specified during a registration process for a view of the client.

In one embodiment in accordance with techniques herein, the registration criteria and clients may use the client object model as described above. As will be described in more detail in following paragraphs, information regarding the state of entities in the data storage system may be collected and stored in accordance with a different model of the database. Using techniques herein, processing may be performed to map data elements of client object model to corresponding ones of the database object model and vice versa in connection with providing view indications.

Figure 3:
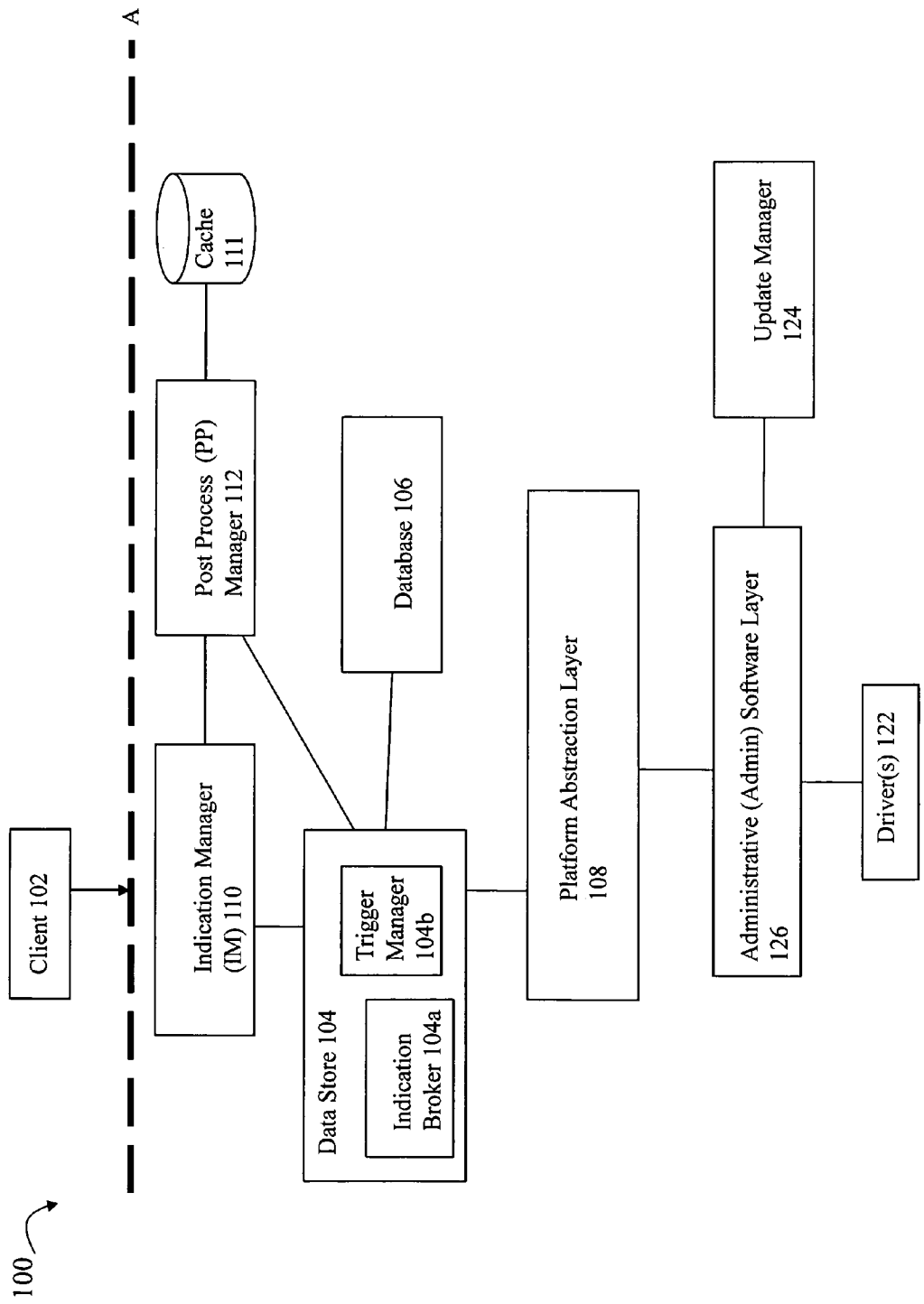
FIG. 3 is an example illustrating data flow and communications between components in an embodiment in accordance with techniques herein when performing indication registration processing.

Referring to FIG. 3, shown is an example of a components that may be included in an embodiment in accordance with techniques herein. The example 100 includes components of the data storage system and an external client 102 used to illustrate software components or modules that maybe used in connection with indication management in accordance with techniques herein. The dashed line denoted as A may represent a partitioning of components included in the data storage system (e.g., those below the dashed line A) and those which are external to the data storage system (e.g., those above the dashed line A). The example 100 includes a remote or external client 102, indication manager (IM) 110, post process (PP) manager 112, cache 111, data store 104, database 106, platform abstraction layer (PAL) 108, admin (administrative) software layer 126, update manager 124, and driver(s) 122. The data store 104 may include an indication broker 104a and a trigger manager 104b.

A client, such as external or remote client 102, may register with the IM 110 to receive notifications with respect to data changes affecting a view or virtual table used by the client. In connection with client view registration, registration criteria may be specified, such as described elsewhere herein in more detail, in terms of the client data model identifying the objects, attributes, and/or classes and types of operations on objects and/or classes (e.g., creation, deletion, changes or modifications) about which the client is to be notified regarding data changes affecting the view. As part of client registration, such registration criteria may be transmitted from the external client 102 to the IM 110. Client 102 may be characterized as a registered subscriber of IM 110 for view notifications.

The IM 110 may maintain a list of registration criteria for use with techniques herein where the list includes information representing what content, such as data elements, in the registered view is monitored in connection with determining whether to send notifications to registered subscriber(s). The list of registration criteria may identify the objects and/or attributes of the view that are registered. More generally, the view may be characterized as a virtual table used by clients of the indication management described herein. The IM 110 may be notified (e.g., such as by the PP manager 112 described in more detail below) when there is a data change affecting one or more registered view data values. Accordingly, the IM 110 may then notify the appropriate client using the affected view.

Data describing a state of components of the data storage system may be stored in the database 106. Element 106 may represent a database or other data container in which data is stored. The view for which indication management is performed and for which registration is performed for client 102 may depend on one or more values of one or more database tables included in the database 106. The view or virtual table used by client 102 may be in accordance with a client object data model as described above and elsewhere herein. The database 106 may include database tables used to generate the view or virtual table using database query commands. The database tables of the database 106 may be in accordance with the database object model as described above and elsewhere herein.

The cache 111 may include cached values used in connection with providing view notifications for registered views. The cache 111 may generally be any type of data container (e.g., file, directory, database, memory, and the like) suitable for storing the cached values. As will be described in more detail below, data of the cache 111 may be used in connection with determining whether to send a notification regarding a data change that has impacted a registered view.

The drivers 122 collect information which is reported through a call stack of software layers including the admin software layer 126, PAL 108, and data store 104, where such information may then be stored in the database 106 by the data store 104.

The update manager 124 may generate a request to poll the drivers 130 for state information. The update manager 124 may generate a polling request in response to an occurrence of a defined polling interval, as well as an occurrence of one or more other defined events. The update manager 124 may issue the request to the admin modules of layer 126 which then obtain the state information from the drivers 130. The admin modules of layer 126 then communicate the state information to the PAL 108 and then data store 104. The data store 104 may process the received state information and populate the database 106 by performing database operations such as by issuing appropriate database commands including update, insert and/or delete database commands to update database table(s). The layer 126 may receive data in the form of objects in accordance with an administrative data model which may then be further mapped into the database model as stored in the database 106. The database model of the database 106 may include data stored in one or more database tables where such tables include one or more rows of data elements as described elsewhere herein.

The data store 104 may perform database operations which update the appropriate database tables, and portions thereof, in accordance with the received state information from the drivers 130. The data store 104 includes a trigger manager 104b which sets appropriate database triggers (as explained in more detail below) so that upon the occurrence of a database operation which fires a trigger, the trigger manager 104b is notified by the database 106. Such trigger indications may identify, for example, which row of a database table has been modified as a result of performing a database operation to store the received state information. In one embodiment, database 106 may track the database table row-level changes and notify the trigger manager 104b regarding such changes in accordance with previously set database triggers. The database 106 may provide the trigger manager 104b with a database (DB) key or row identifier (ID) used to identify each row of a database table that has been modified as a result of performing the database operations causing a trigger. Processing as may be performed by the indication broker 104a and the PP manager 112 is described in more detail in following paragraphs in connection with the techniques herein.

In connection with performing the database operations such as update, insert and/or delete with respect to a row of a database table, it should be noted that the net or end result of performing a database operation on the database 106 may not cause a change to one or more data values stored in the database tables of the database 106 and/or a virtual table for a view as used by the client 102. For example, an update command may rewrite a same data value to a row of a database table. As another example, if a view is dependent on a row of data of a first database table, an update to the row of the database table may not result in a change to the data included in the view. To further illustrate, the row of the database table may include 5 values and the view may include a data element which is the sum of the 5 values in the database table row. The database table row may be updated to modify and change one or more of the values. However, the resulting sum as included in the view may be the same before and after such modification. As such, there is no change to the view's data and no notification to the client using the view is needed. Based on this, a determination as to whether a data value currently stored in the database 106 and/or a data value of the virtual table or view used by the client has been updated to a different value may not be detectable solely based on tracking which database table rows have been updated, deleted and/or inserted. To this end, data values may be stored prior to indication notification processing (e.g., stored as part of indication registration processing) in the cache 111 in accordance with registered data elements identified by the registration criteria. Such data values may be stored in the cache 111 for use in connection with techniques herein with indication notification processing so that the client using a view is notified only when there has been a change to a data value included in the view requiring that the view be updated. Even though the database operation may update a database table such as by adding a new row, deleting a row, or modifying one or more values of an existing row, such operation may be characterized as potentially resulting in a change or new data value for the view. Processing may be performed in connection with techniques herein to determine if the foregoing actually results in a change or new data value for the view. If the net result of performing the database operation does not cause, for example, a current data value of the view to be replaced with a new data value different from the current data value, the techniques herein perform processing to detect the foregoing so that no indication is sent to the client. The data that may be selectively stored in the cache 111 in an embodiment in accordance with techniques herein is described in more detail below.

The database 106 may provide for database change tracking and notification whereby a software module, such as the trigger manager 104b, may register to receive notification for one or more changes to the database. For example, the trigger manager 104b may register to receive notification by the database 106 when there is an operation performed which modifies one or more database tables upon which a view of the client is dependent. The conditions or database events about which the module 104b is notified in accordance with techniques herein may be specified using database triggers described in more detail below. To this end, the module 104b may request to receive notification upon the occurrence of selected database operations to selected database tables, where the selected database operations and database tables may be identified via defined database triggers. The database trigger may be customized for the particular database tables upon which the client view is dependent. The database operations that may be specified in a database trigger may include, for example with reference to a single database table, database commands to delete a row of a table, update an existing row of a table, or add a new row to a database table. In an embodiment utilizing an object-based model, a row of a table may correspond to an object instance and values in each column may correspond to an attribute or property of an object. In one embodiment, database trigger notification may provide for notification regarding the database table row-level changes. The notification message may vary with embodiment and may, for example, identify the table, the type of operation performed (e.g., table row delete, table row add, table row update), the modified or changed data related to the operation (e.g., what new data was added, deleted, if there was an update, both the old and new data), and the like. An embodiment may alternatively just provide a notification message about the operation performed and the database (DB) key or row identifier (ID) used to identify each row of a database table that has been modified as a result of performing the database operations. The module receiving the notification may then query the database for additional information to obtain the data related to the modification rather than have this transmitted as part of the database change tracking notification. An embodiment may also utilize a database implementing variations of the foregoing in connection with database change tracking and notification. For example, the database may optionally provide for different levels or granularity of change tracking and notification besides on a single database table row. For example, an embodiment may utilize a database providing change tracking at the database column level in addition to providing tracking and notification per database table row. All such embodiments and variations may utilize the techniques herein to provide for database change notification tracking.

Described in following paragraphs and figures are examples illustrating use of the techniques herein for registration and notification in connection with a view or virtual table as may be used by a client so that the client may appropriately maintain an up-to-date virtual table based on any changes made to an underlying database table upon which the view is dependent. For a view V1 used by the client, the client may register to receive notifications for any data changes to V1 by registering to receive notifications for any deletions deleting a row of V1, new operations adding a new row to V1, and update or change operations modifying a value in an existing row of V1. In the context of a simple example, subscription and notification processing are described below for each of the operations of new, delete, and change or update with respect to the view or virtual table.

Figure 3A:
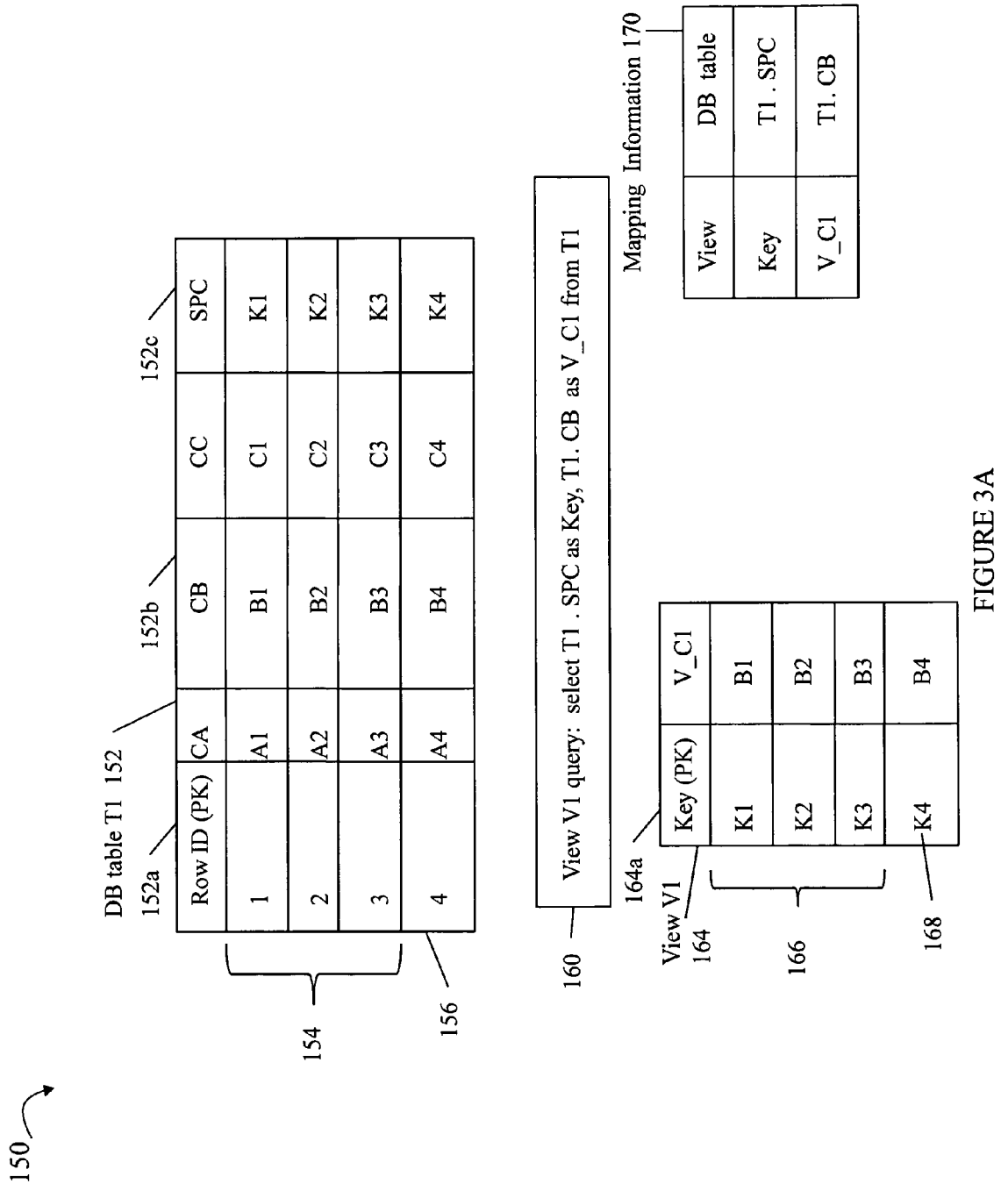
FIGS. 3A, 6B, 8, and 9 illustrate tables in connection with examples that may be used in connection with performing the techniques herein.

Referring to FIG. 3A, shown is an example 150 that will be described in connection with illustrating use of the techniques herein for view registration and notification for new, delete and update or change operations. The example 150 includes database (DB) table T1 152, a view query 160, view or virtual table V1 164, and mapping information 170. The DB table T1 152 may include data stored in the database 106. The first row of T1 includes column identifiers (e.g, RowID, CA, CB, CC, SPC) which is not data of the table but rather may be characterized as table metadata providing a name or identifier for each column (or property of an object). Each row of T1 other than the first row may correspond to an object and include multiple values. Column 152a includes the Row ID or primary key (PK) for the table T1. The PK of the database table is used to specify a value uniquely identifying each row of the table or object. The remaining columns of table T1 152 include property or attribute values for each object instance corresponding to a row of T1.

In a manner similar to that as described above for T1, the view or virtual table V1 164 includes a first row of column identifiers (e.g., Key, V_C1) which is not data of the table V1 but rather may be characterized as table metadata providing a name or identifier for each column (or property of an object). Each following row of 164 includes data of the virtual table with a row corresponding to data for an object instance and each column (other than the first column 164a) corresponding to an object property or attribute. Column 164a, Key, is the PK for the view or virtual table in a manner similar to that as described above for element 152a of T1.

Element 160 specifies the command to generate the view or virtual table V1 164 using the table T1. A particular column of either V1 or T1 may be specified as "table . column", where table refers to a particular table name such as T1 or V1, and column refers to the column or property identifier in each of the first rows of 152, 164 (e.g., column may be RowID, CA, CB, CC, SPC for database table T1, column may be Key or V_C1 for virtual table V1). In this example, element 160 specifies a database query applied to database table T1 to select particular values from columns of T1 which are included in the view or virtual table V1 164. Values from column 152c of T1, denoted by SPC, are included in the first column 164a of V1. Values from column 152b of T1, denoted by CB, are included in the second column 164b of V1.

Mapping information 170 may be used in connection with determining data dependencies between the view using the client object model and the database table using the database object model. The mapping information may identify the data dependencies between a view and associated database elements (e.g., database tables and columns). Each of the data elements in the view as used by a client may be dependent upon one or more data elements of the database model. The mapping information may identify, for example, one or more object attributes of the view or virtual table as used by the client which are determined or otherwise dependent on one or more data elements included in one or more database tables. The use of the information 170 is illustrated in processing in following paragraphs. Subscription and notification processing with respect to a new operation as applied to the view or virtual table V1 will first be illustrated.

Element 154 may identify the portion of T1 at a first point in time where the table T1 includes 3 rows of data for three object instances. Element 166 may identify the portion of V1 generated using the portion 154 of T1 at the first point in time. Thus, element 166 represents the view V1 at the first point in time. Subsequently, at a second point in time, a new row 156 may be added to the database table T1. The techniques herein for "new" subscription and notification as applied to the view V1 may be used to fire a notification to the client using V1 that V1 should be updated to include the new row 168. The new row 168 corresponds to the change to V1 as a result of performing the database operation to T1 to add new row 156.

In order for client 102 to receive a new indication regarding row 168 for V1, the client needs to have previously subscribed or registered to receive such indications with respect to virtual table or view V1.

Figure 4A:
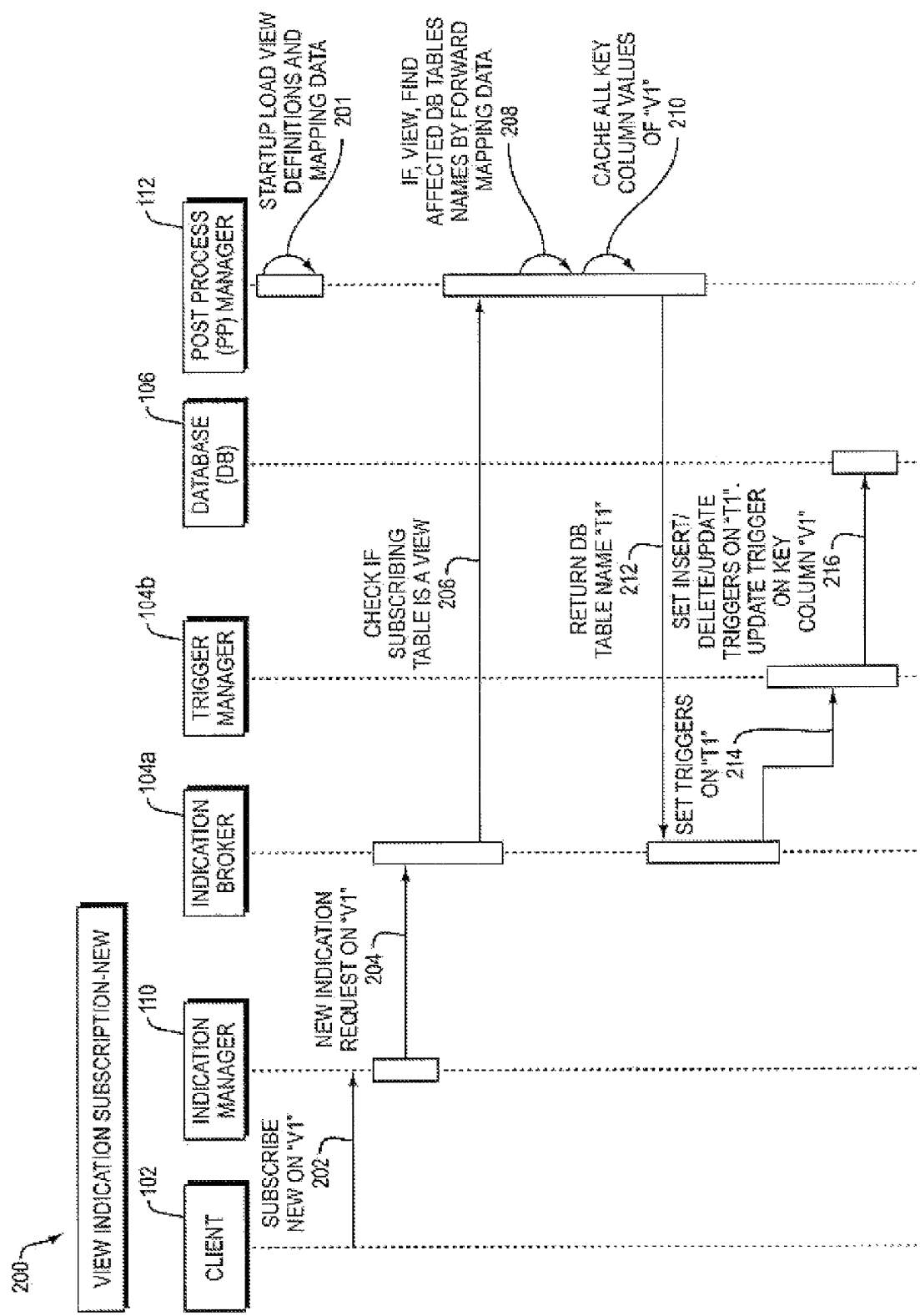
FIGS. 4A, 4B, 5A, 5B, 6A, 6C, and 9B are examples of sequence diagrams outlining steps that may be performed in an embodiment in accordance with techniques herein.

Referring to FIG. 4A, shown is an example of a sequence diagram illustrating processing that may be performed in connection with subscription processing to register client 102 to receive new view indications for V1. At step 201, the initial view definitions for V1 along with the mapping information 170 are loaded. It should be noted that step 201 may be performed at system startup prior to receiving any client view subscription requests. The initial view V1 may be as illustrated in 166 of FIG. 3A based on the current contents at the first point in time of T1 152 as represented by element 154. In order for the client to be notified regarding any new row added to V1, the client may perform subscription processing to register to receive such notifications. At step 202, the client 102 may issue a subscription request to receive notifications regarding any new rows added to view V1. The subscription request is sent from the client 102 to the IM 110. At step 204, IM 110 then issues a new indication request for V1 to the indication broker 104a. At step 206, the indication broker 104a issues a request to PP manager 112 inquiring as to whether the table V1 is a view and thus subject to subscription processing in accordance with techniques herein.

At step 208, PP manager 112 determines whether the table V1 is a virtual table or a database table. PP manager 112 may perform this determination, for example, by examining the database table names of the database 106 (e.g., assuming there is a common name space for virtual and database tables). At step 208, if it is determined that the table V1 is a view or virtual table, the PP manager 112 determines the database tables upon which V1 is dependent using the mapping information 170 to perform forward mapping. With forwarding mapping, an input may be a view V1 for which an output is determined identifying one or more database tables upon which V1 depends so that any data change to one of the identified database tables needs to be analyzed to determine whether there has been a data change V1. In this example, the table T1 152 is identified by the forward mapping for V1. At step 210, all "key" column values (e.g, values in column 164*a* of portion 166 of view 164) are cached. Step 210 caches the set of current values of PK of the view V1 (e.g., values for V1 . Key, so that K1, K2 and K3 are selectively cached). Such cached PK values for V1 are used in connection with subsequent processing to determine whether there has been a new row added to V1 thereby resulting in firing a new indication to the client for V1. At step 212, the PP manager 112 returns the database table name T1 to the indication broker 104*a*. In connection with techniques herein, database triggers may be set on the database tables. However, since the original client subscription request (e.g. step 202) for new indications are in terms of the client data model or virtual table V1, the subscription processing first determines the corresponding database table used to calculate V1 (e.g., upon which V1 is dependent) in steps as just described. Now, in step 214, the indication broker 104*a* issues a request to the trigger manager 104*b* to set appropriate database triggers for the database table T1 upon which V1 depends. At step 216, the trigger manager 104*b* issues a request to the database to set the appropriate triggers for the client new subscription request for V1 which depends on T1. Step 216 includes setting insert, delete and update triggers on database table T1. The trigger manager 104*b* is notified by the database 106 upon the occurrence of any operation performed to table T1 which inserts a new row into T1, deletes a row from T1, or updates the column(s) of T1 upon which the PK of V1 depends. In connection with the update trigger with this example, the database provides notification to the trigger manager 104*b* if an update operation is performed to modify a value in T1 . SPC upon which the PK of V1 (e.g., V1 . Key) depends. Generally, step 216 may include setting update triggers on one or more properties of one or more database tables upon which the view calculation depends in connection with adding a new row to the view. That is, if a change is made to any one of the values of a database table for which an update trigger is set, such a change may result in adding a new row to the view.

It should be noted that for the "new" view subscription request as well as other view subscription requests described below for view delete and view updates, the subscription processing sets database triggers for database operations other than that of the view subscription request. For example, in connection with the "new" view subscription request described above, step 216 includes not only setting database triggers for new database table operations but also for delete and update database table operations. This is because we do not know how a particular database operation will affect a view and may vary depending on how data values of the view utilize or depend upon one or more values of one or more database tables. This is described in more detail elsewhere herein.

At this point after the foregoing new subscription request for V1 of the client is completed, a new row is added to T1 as represented by 156 of FIG. 3A. What will now be described is new notification processing for view indications as may be performed in an embodiment in accordance with techniques herein with reference to FIG. 4B.

Figure 4B:
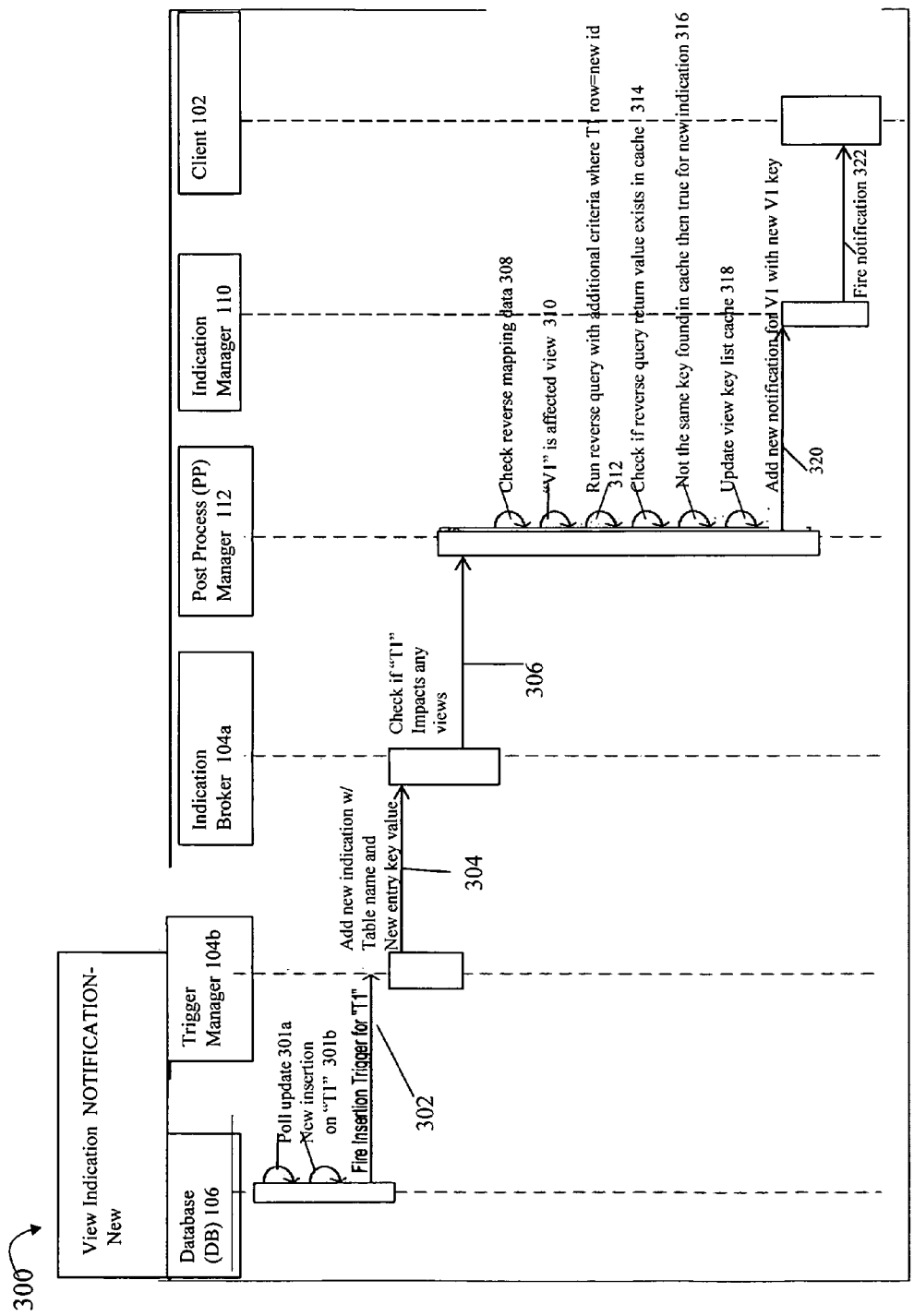

FIG. 4B is an example illustrating a sequence diagram of steps that may be performed in an embodiment in accordance with techniques herein. At step 301*a*, a polling update may results in a new set of data being received from the drivers and may result in inserting a new row 156 (of FIG. 3A) into database table T1 in step 301*b*. In response to step 301*b*, the database 106 fires a database insertion trigger for T1 to the trigger manager 104*b*. In the database insertion trigger received by 104*b*, the table T1 and the PK of the newly added row in the table T1 may be identified. In this example, the new row added is represented by element 156 of FIG. 3 having a PK=T1 . RowID=4. At step 304, a request is sent from the trigger manager 104*b* to the indication broker 104*a* to further process the new indication for the table T1 and the newly added row, RowID=4. At step 306, the indication broker 104*a* issues a request to the PP manager 112 to determine if the received indication in step 304 for table T1, newly added row 4, impacts or affects data of any views. In response, the PP manager 112 performs processing steps. At step 308, the mapping information 170 may be used to perform reverse mapping to determine which one or more views use or are dependent on database table T1. In connection with this example, step 310 determines that V1 is dependent on T1. The reverse mapping operation may generally be described as having an input which is a database table such as T1 and determining an output which identifies any views or virtual tables which are dependent on the database table identified in the input. At step 312, a reverse query for V1 is executed. The reverse query may be based on the original query of 160 of FIG. 3A with additional query or filtering criteria based on the PK of the newly added row of table T1, as identified in the database trigger notification. For example, the reverse query performed in step 312 may be:

SELECT T1 . SPC as Key, T1 . CB as V_C FROM T1 WHERE RowID=4

In connection with the above, the WHERE clause (e.g., "WHERE RowID=4") is the additional query filter criteria. The reverse query result identifies what has been changed (e.g. the new row) in the view V1 based on the newly added database table row T1 . RowID=4. The result of the above reverse query is V1 . Key=K4 and V. V_C1=B4 as included in 168 of FIG. 3A (e.g., the newly added row of the view V1 virtual table). The value of interest in the reverse query result is the value of the PK or Key of the view V1 included therein (e.g., K4). As a variation to the foregoing, the reverse query in step 312 may be:

SELECT T1 . SPC as KEY, FROM T1 WHERE RowID=4 which produces query results also including the value K4, the PK of the view V1 for the newly added virtual table row.

In connection with this example, the new row 156 of FIG. 3A added to the database table T1 results in a new row 168 added to the view table V1 164. However, depending on the mapping or data dependency between the view and the affected database table, this may not always be the case. As such, additional processing is performed to determine whether the PK of the view V1 returned in the reverse query identifies a new PK or new row in the virtual table V1. This is performed in connection with step 314. At step 314, a determination is made as to whether the reverse query result includes a new PK value for V1 (thereby identifying a new row in V1), or otherwise whether the PK value for V1 included in the reverse query result matches an existing PK value for V1 (thereby indicating that the database table change does not result in a new row being added to the virtual table or view). The current set of PK values for V1 are stored in cache (e.g., as a result of previously executing step 210 of FIG. 4A). Therefore, at step 314, a comparison may be made between the current list of PK values for V1 as included in cache and the PK value for V1 as returned by the reverse query. At step 316, if it is determined that the PK value for V1 included in the reverse query result (e.g. K4) is not included in the cached list of PK values for V1, then it is determined that a new row is added to V1 as a result of the new database operation to table T1 and steps 318, 320 and 322 are performed. Otherwise, if step 316 determines that the PK value for V1 included in the reverse query result (e.g. K4) is included in the cached list of PK values for V1, then it is determined that no new row is added to V1 as a result of the new database operation to table T1 and no new indication is fired.

In connection with this example, step 316 compares K4 (the PK value for V1 in the reverse query result) to the cached PK list for V1 (which includes K1, K2, K3) and concludes that K4 is not in the cached PK list thereby indicating that a new row is added to the virtual table V1 as a result of the new row added to the database table T1. At step 318, the cached list of PK values (e.g., V1 . Key values) is updated to include the new PK value K4. At step 320, a new notification is sent for V1 with the new V1 PK (e.g., V1 . Key=K4) from PP manager 112 to the IM 110. Accordingly, the IM 110 fires a new notification to the client 102 for the view V1 with the new V1 PK, V1 . Key=K4. The client may then perform processing to retrieve the complete new row of virtual table data such as by reissuing the original query. Alternatively, the IM 110 may return to the client in the new view indication the complete new virtual table V1 row. The information returned to the client may vary with embodiment. In any case and however the processing is partitioned between the client and other software modules, the client is notified of the newly added row to the virtual table or view V1 and may obtain the data of the newly added row to V1 in order to update V1.

With reference back to FIG. 3A, what will now be described is an example illustrating use of the techniques herein with view indication processing for subscription and notification in connection with a delete operation for the view. Assume that the client also requests to subscribe to view V1 indications when a row is deleted from V1. In this case, the steps illustrated in FIG. 5A may be performed.

Figure 5A:
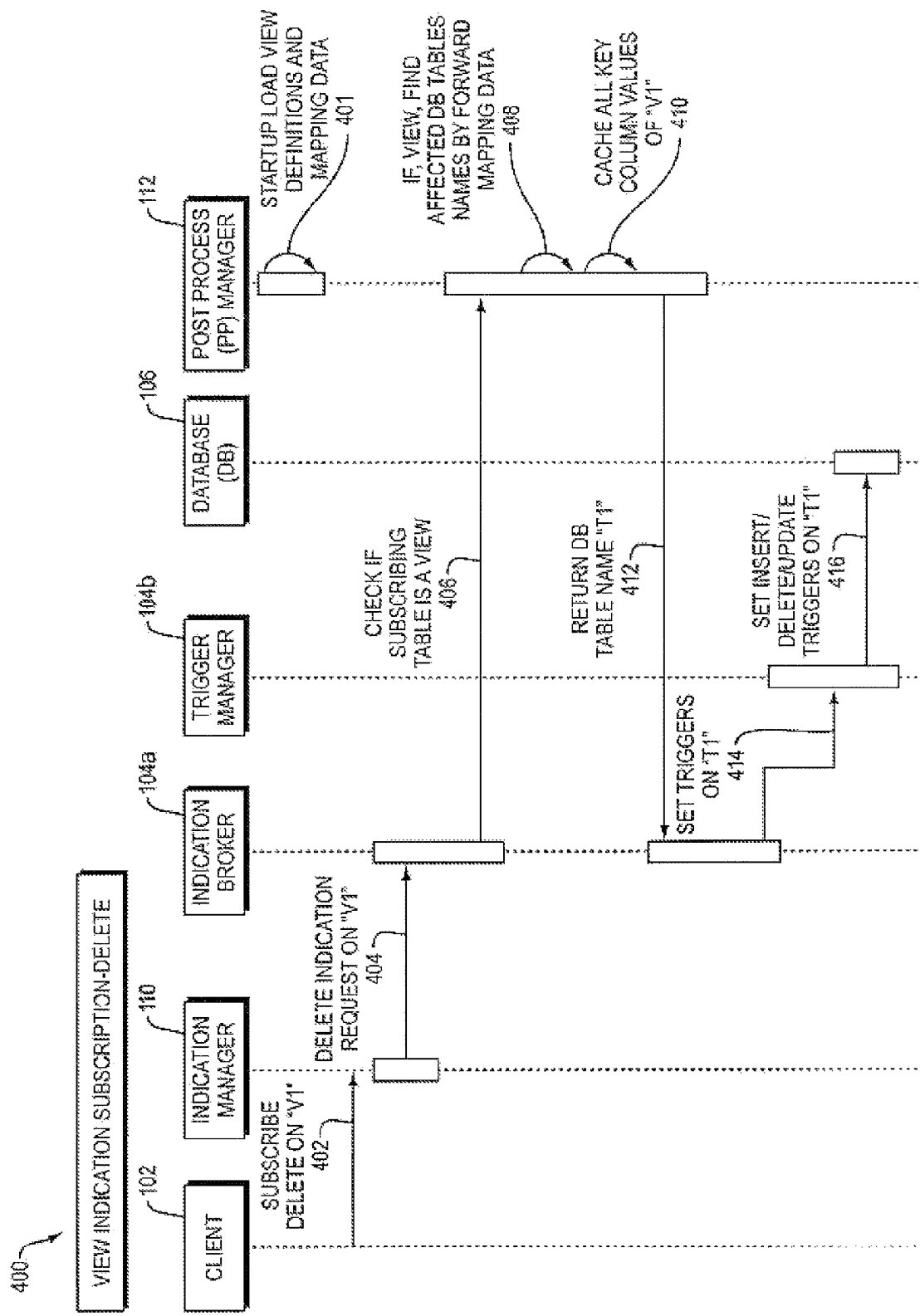

Referring to FIG. 5A, shown is a sequence diagram of processing steps that may be performed in connection with processing a client's view indication subscription request for a delete operation for a view. In this example, the client 102 may subscribe to receive notifications regarding rows which are deleted from view V1 and the steps of FIG. 5A may be performed. It should be noted that steps 401, 402, 404, 406, 408, 410, 412, 414 and 416 correspond, respectively, to steps 201, 202, 204, 206, 208, 210, 212, 214 and 216 of FIG. 4A describing processing performed for view indication new subscription request with the difference that steps 402 and 404 identify a delete indication subscription request rather than a new indication subscription request.

With reference back to FIG. 3A, at a later point in time after the client 102 has registered to receive delete view indications for V1 by performing FIG. 5A processing, assume row 156 of the table T1 152 is deleted so that T1 now contains the three rows of 154. What will now be described is delete notification processing for view indications as may be performed in an embodiment in accordance with techniques herein with reference to FIG. 5B.

Figure 5B:
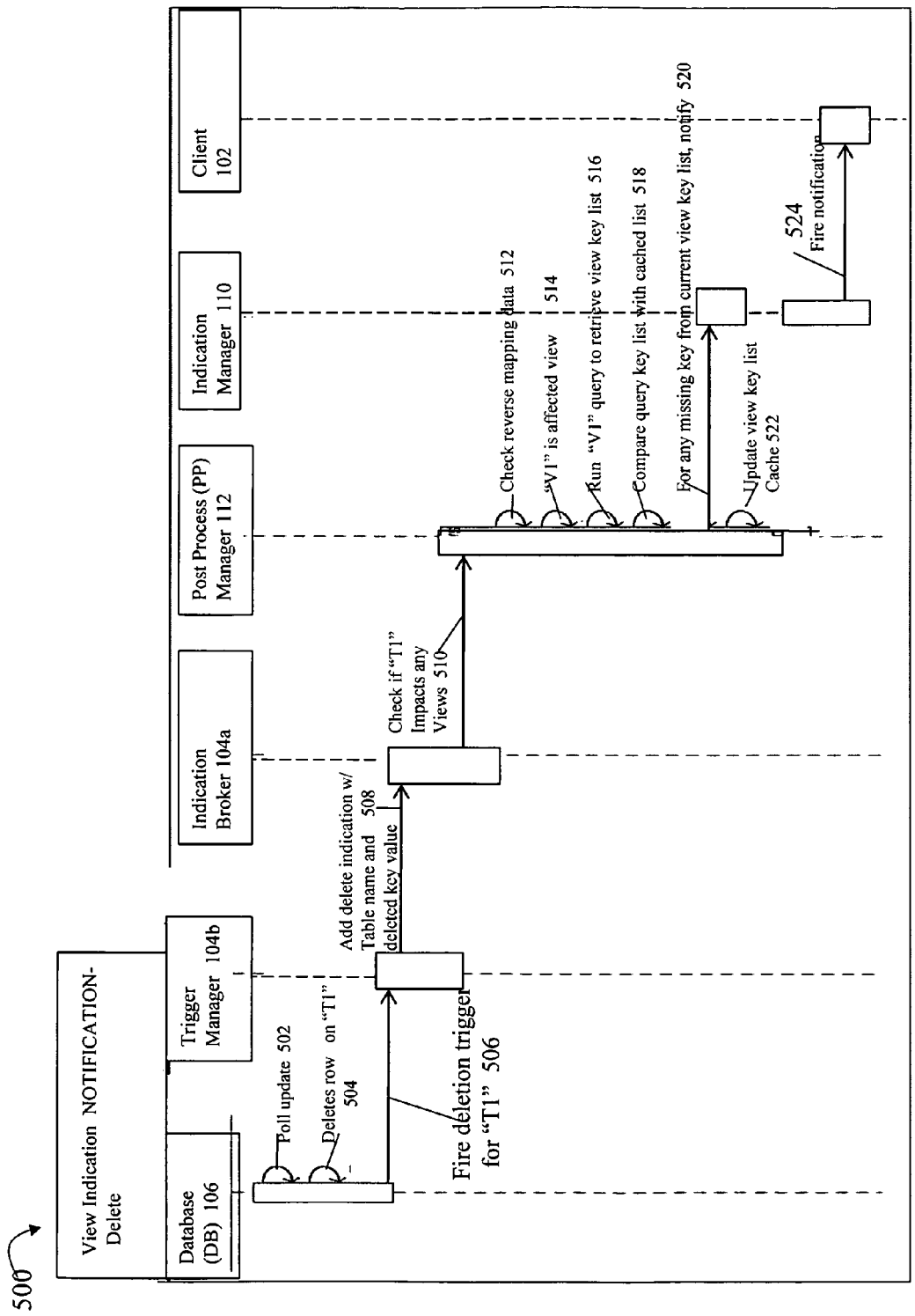

FIG. 5B is an example illustrating a sequence diagram of steps that may be performed in an embodiment in accordance with techniques herein. At step 502, a polling update may result in a new set of data being received from the drivers and may result in deleting an existing row 156 (of FIG. 3A) from database table T1 in step 504. In response to step 504, the database 106 fires a database deletion trigger for T1 to the trigger manager 104b in step 506. In the database deletion trigger received by 104b, the table T1 may be identified along with the PK of the deleted row in the table T1 (e.g. value for T1 . RowID of the deleted row). In this example, the deleted row 156 has a PK=T1 . RowID=4. At step 508, a request is sent from the trigger manager 104b to the indication broker 104a to further process the delete indication for the table T1 and the deleted row, RowID=4. At step 510, the indication broker 104a issues a request to the PP manager 112 to determine if the received indication in step 508 for table T1, deleted row 4, impacts or affects data of any views. In response, the PP manager 112 performs processing steps. At step 512, the mapping information 170 may be used to perform reverse mapping to determine which one or more views use or are dependent on database table T1. In connection with this example, step 514 determines that V1 is dependent on T1.

It should be noted that the foregoing steps 502, 504, 506, 508, 510, 512 and 514 are respectively similar to steps 301a, 301b, 302, 304, 306, 308 and 310 with the difference that steps 504, 506 and 508 are performed with respect to the delete indication for the database table T1 row 4. At step 516, the original query 160 of FIG. 3A used to generate the view or virtual table V1 is executed using the latest updated database table T1 152 which, at this point, includes the rows of portion 154 since 156 has been deleted. Step 516 returns query result including the view V1's PK list. It should be noted that rather than run the complete query as specified in 160, a modified version of 160 may be executed as follows to only specify the view V1 PK:

View V1 query: select T1 . SPC as Key from T1

In connection with the example, the query results include the view V1 current PK list (e.g., list of current values in column V1 . Key) which is K1, K2 and K3. At step 518, the current PK list for V1 as returned in step 516 is compared to the cached PK list for V1. Recall that the PK list for V1 prior to the deletion operation of step 504 was cached as part of view delete subscription processing in step 410. In a manner similar to that as described in connection with FIG. 4B processing, the result of comparing the cached PK list for V1 to the current PK list for V1 indicates what one or more rows of V1 have been deleted, if any. Specifically, any PK of the cached PK list for V1 which does not appear in the current PK list for V1 (query result of step 516) indicates that the view row having the PK has been deleted from the view V1. For example, the current PK list for V1 as returned by step 516 includes K1, K2, and K3 and the cached PK list for V1 includes K1, K2, K3 and K4. In this case, K4 is included in the cache list of PK values for V1 but not in the current PK list for V1 thereby indicating that a row of V1 has been deleted having the V1 . Key=K4. At step 520, a notification for the deleted row as identified by K4 of V1 (e.g. missing PK value K4 from the current PK list for V1) is sent from PP manager 112 to IM 110 resulting in a view deletion indication for V1 . Key=K4 being fired in step 524 to the registered client 102. At step 522, the cached list of PK values for V1 is updated to reflect the deleted row K4. Therefore, K4 is deleted from the cached list to reflect the current state of the view V1 (e.g., as represented by 166 of FIG. 3A) after row 156 is deleted from table T1 152.

Step 524 is similar to step 322 of FIG. 4B with the difference that the notification in 524 is for view deletion. In step 524, the IM 110 fires a view deletion notification to the client 102 for the view V1 indicating the deleted view row identified by the deleted row's corresponding PK (e.g., V1 . Key=K4). The client may then perform processing to delete the row from the virtual table V1.

What will now be described is an example illustrating processing that may be performed in accordance with techniques herein for view indication subscription and notification with respect to an update or change to an existing row of a view. For this next example, assume the table T1 of FIG. 3A includes 4 rows as illustrated by the combination of 154 and 156 and V1 includes the 4 rows illustrated by the combination of 166 and 168. The client 102 issues a request to register to receive view change/update indications for V1 indicating that a data value in an existing row of V1 has changed. In this example, the subscription request for view change/update may specify one or more view columns for which the view registration is performed. In an embodiment in which the view has multiple columns, the view indication registration request may be issued to register each such view column for changes/updates in order to provide indications for any updates/changes to the view.

Figure 6A:
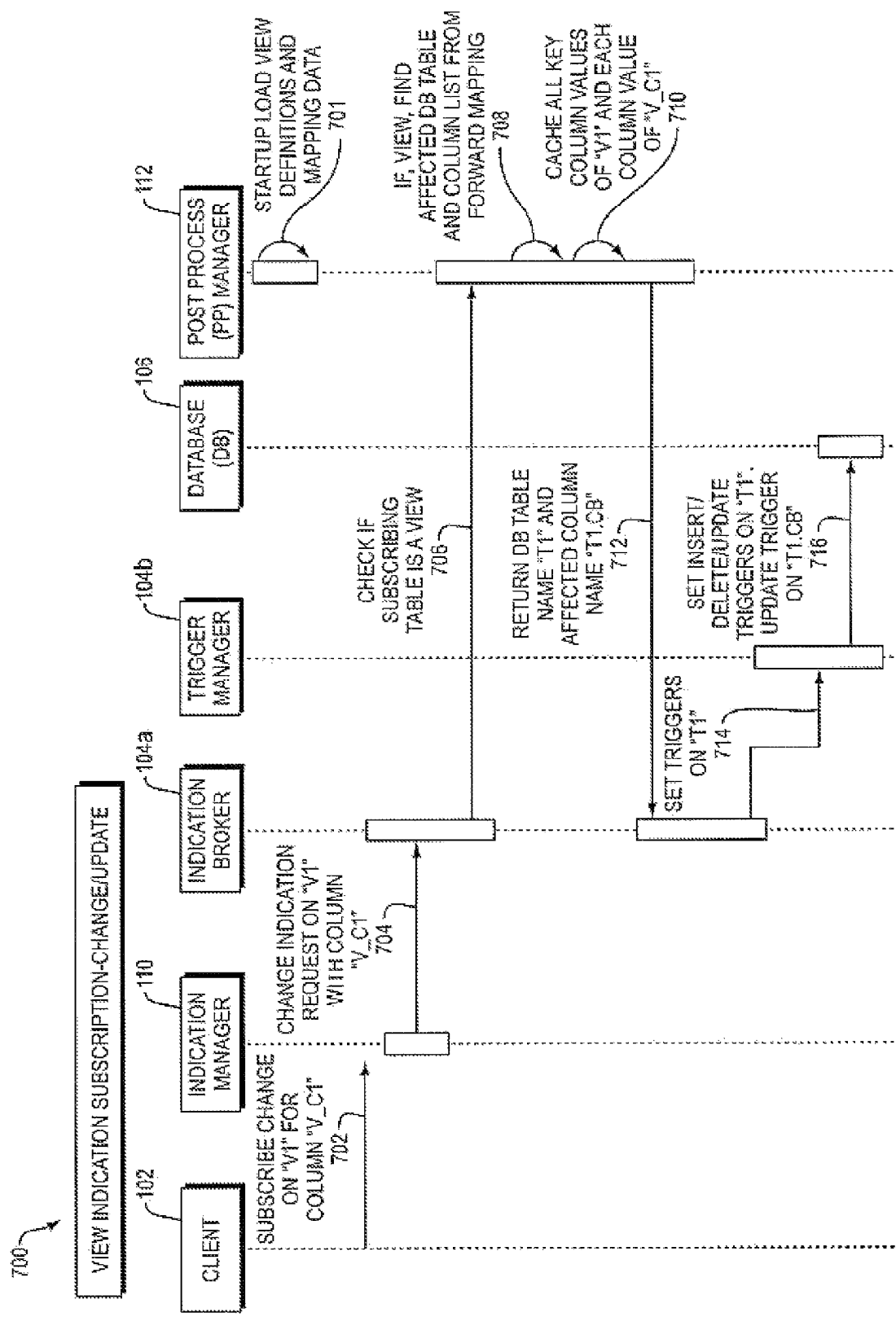

Referring to FIG. 6A, shown is a sequence diagram of processing steps that may be performed in connection with view indication subscription processing for a view change/update. In this example, the client 102 may subscribe to receive notifications regarding an existing view row which is updated/changed from view V1 and the steps of FIG. 6A may be performed. At step 701, the initial view definitions for V1 along with the mapping information 170 are loaded as described above. It should be noted that step 701 may be performed at system startup prior to receiving any client view subscription requests. At step 702, the client 102 may issue a subscription request to receive notifications regarding any update/change to existing rows of view V1 for a view column denoted V_C1. The subscription request is sent from the client 102 to the IM 110 in step 702. At step 704, IM 110 then issues a change/update indication request for V1 . V_C1 is sent to the indication broker 104a. At step 706, the indication broker 104a issues a request to PP manager 112 as to whether the table V1 is a view and thus subject to subscription processing in accordance with techniques herein. At step 708, PP manager 112 determines whether the table V1 is a virtual table or a database table. Additionally, if it is determined that the table V1 is a view or virtual table, the PP manager 112 determines the database tables upon which V1 is dependent using the mapping information 170 to perform forward mapping as described above in connection with view subscription processing for other operations of new and delete. Additionally, step 708 determines the affected column(s) of the identified database table(s) upon which the identified view column V1 . V_C1 depends. In this example, step 708 determines that V1 . V_C1 (e.g., the view column identified in the view change subscription request for which view change indications are subscribed) depends on a single column of a single database table, T1 . CB. At step 710, processing is performed to cache all PK values of V1 (e.g., K1, K2, K3 and K4) along with corresponding V1 column values for V1 . V_C1 of the subscription request (e.g., cache values for B1, B2, B3 and B4). At this point the values cached in step 710 may be stored in pairs to indicate the correspondence between a PK value of V1 and its corresponding V_C1 value as illustrated by the combination of 166, 168 of FIG. 3A. At step 712, the PP manager 112 returns the database table name T1 and the affected database table column name "T1 . CB" to the indication broker 104a. In connection with techniques herein, database triggers may be set on the database tables. However, in a manner similar to that as described above with other view subscription request processing, since the original client subscription request (e.g. step 702) for change/update indications are in terms of the client data model or virtual table V1, the subscription processing first determines the corresponding database table used to calculate V1 (e.g., upon which V1 is dependent) in steps as just described. Now, in step 714, the indication broker 104a issues a request to the trigger manager 104b to set appropriate database triggers for the database table T1 upon which V1 depends. At step 716, the trigger manager 104b issues a request to the database to set the appropriate triggers for the client update/change subscription request for V1 which depends on T1. Step 716 includes setting insert, delete and update triggers on database table T1. The trigger manager 104b is notified by the database 106 upon the occurrence of any operation performed to table T1 which inserts a new row into T1, deletes a row from T1, updates column(s) of T1 upon which V1 . V_C1 (the view column of the subscription request) depends, or updates the column(s) of T1 upon which the PK of V1 depends. In connection with the update trigger with this example, the database provides notification to the trigger manager 104b if an update operation is performed to modify a value in T1 . CB upon which V1 . V_C1 depends or if an update operation is performed to modify a value in T1 . SPC upon which V1 . key (e.g., the PK of V1) depends. Generally, step 716 may include setting update triggers on one or more properties of one or more database tables upon which the view calculation depends in connection with updating V1 . V_C1, the view column specified in the change/update subscription request. Such triggers are set on one or more database tables and one or more columns where changes to any one or more values may cause an update to a value in the view column specified in the change/update subscription request. As with step 216, step 716 may also be generally characterized as including setting update triggers on one or more properties of one or more database tables upon which the view PK is dependent.

With reference back to FIG. 3A, at a later point in time after the client 102 has registered to receive change/update indications for V1 by performing FIG. 6A processing, assume a update or change operation is performed to table T1 as described below.

Figure 6B:
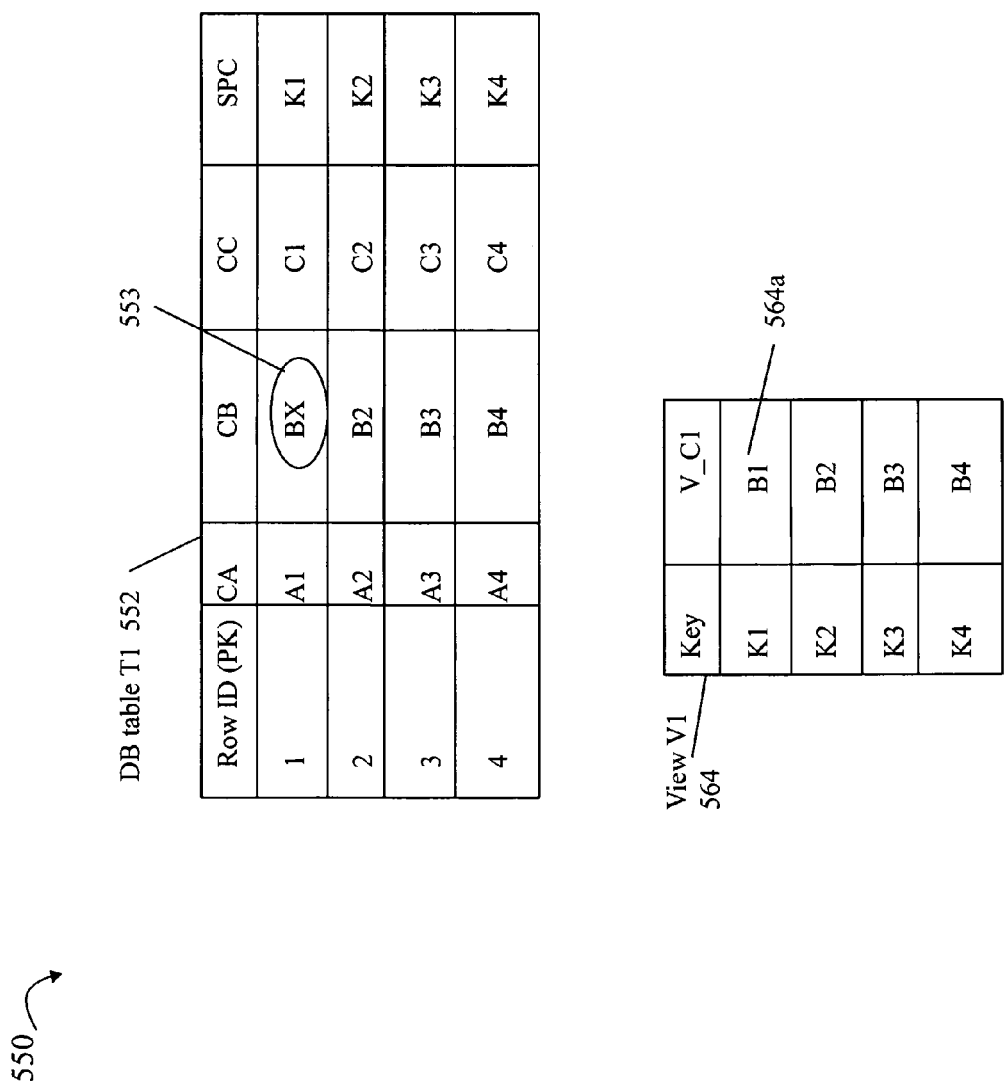

Referring to FIG. 6B, shown is an example 550 including a database table T1 552 and a view V1 564. The database table T1 is similar to that as described above in connection with FIG. 3A with the difference that table T1 552 reflects table T1 after performing an update or change operation which updates element 553 of T1 from "B1" to "BX". The mapping information 170 and database query 160 of FIG. 3A may be used in connection with the example of FIG. 6B. Assuming that the client 102 is registered to receive view change/update indications for V1 prior to this update/change to T1, processing may be performed in connection with techniques herein for view indication notification processing for change/updates as illustrated in FIG. 6C.

Figure 6C:
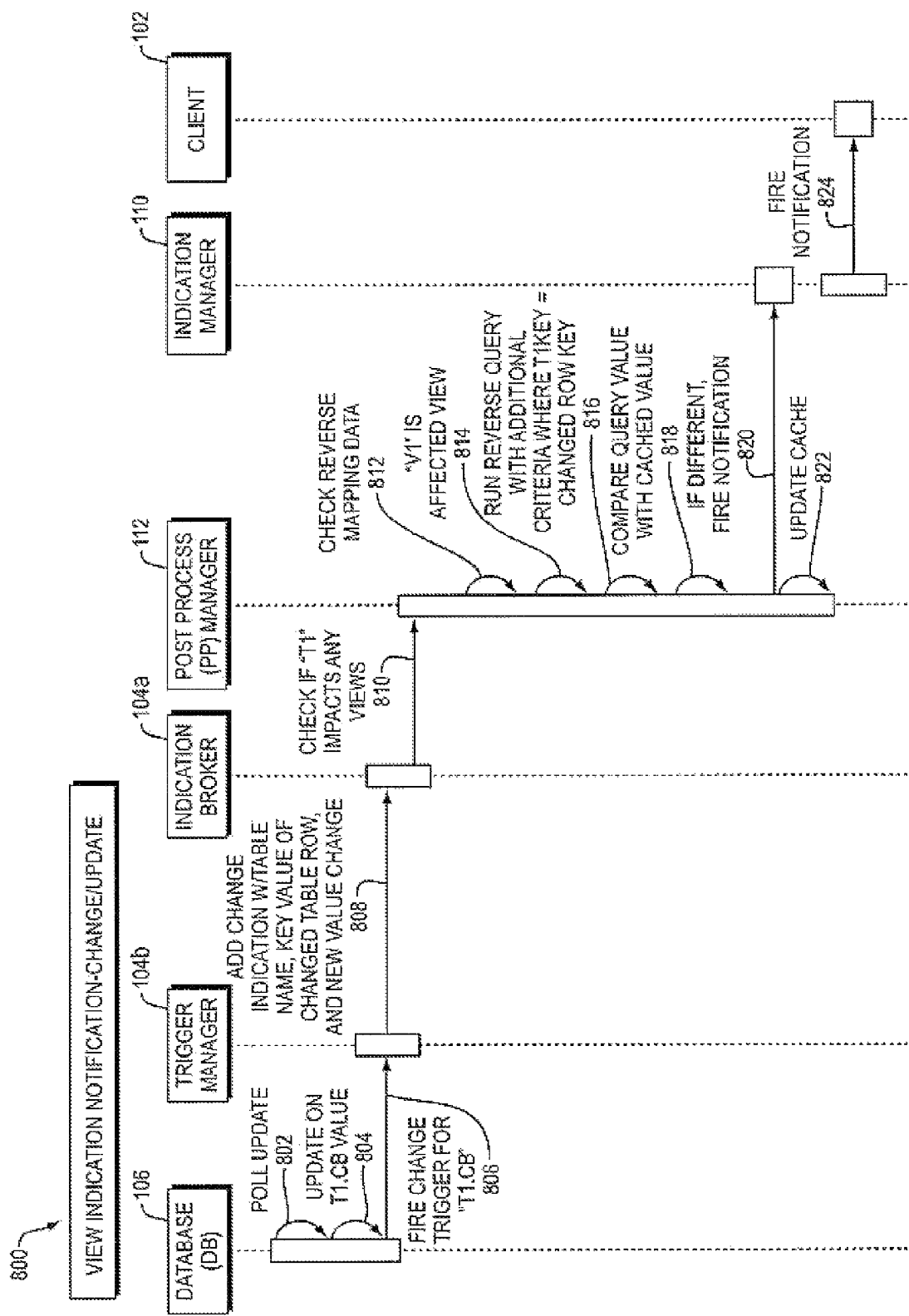

FIG. 6C is an example illustrating a sequence diagram of steps that may be performed in an embodiment in accordance with techniques herein for view indication notification processing for view changes/updates. At step 802, a polling update may result in a new set of data being received from the drivers. In step 804, the polling data may result in updating or modifying property/column value 553 to from B1 to BX in the database table T1. In response to step 804, the database 106 fires a database update/change trigger indication for T1 to the trigger manager 104b in step 806. The change trigger fired in 806 may identify the table T1 along with the PK of the changed row in the table T1 (e.g. value for T1 . RowID of the updated row) and the new or changed data value (e.g., data or property value for 553 in the modified row where T1 . CB of the modified row 1=BX). In this example, the modified row is in database table T1, the modified row of T1 has a PK value=1 (e.g., T1 has a PK=T1. RowID), and the new data value is BX. At step 808, a request is sent from the trigger manager 104b to the indication broker 104a to further process the change/update indication for the table T1 and the updated row, RowID=1. At step 810, the indication broker 104a issues a request to the PP manager 112 to determine if the received indication in step 808 for table T1, changed row 1, impacts or affects data of any views. In response, the PP manager 112 performs processing steps. At step 812, the mapping information 170 may be used to perform reverse mapping to determine which one or more views use or are dependent on database table T1. In connection with this example, step 814 determines that V1 is dependent on T1.

It should be noted that the foregoing steps 802, 804, 806, 808, 810, 812 and 814 are respectively similar to steps 502, 504, 506, 508, 510, 512 and 514 of FIG. 5B and also steps 301a, 301b, 302, 304, 306, 308 and 310 of FIG. 4B with the difference that steps of FIG. 6C are performed with respect to the view change/update indication. At step 816, a reverse query is executed which returns query results including the changed or modified row of view V1. The reverse query may be as generally described above based on the original query of 160 with additional criteria in a WHERE clause specifying that the PK of T1 is equal to the changed row of T1 as included in the database trigger. In this example, the reverse query may be as follows:

Select T1 . SPC as Key, T1 . CB as V_C1 from T1 WHERE T1 . RowID=1

In connection with the example, the reverse query results of 816 are "K1, BX" (e.g., K1 is the column value for SPC in the updated row 1 and BX is the column value for CB of the updated row. At step 818, the updated row of V1 as returned by the reverse query results is compared to the cached data for V1 (e.g., as cached in step 710 of FIG. 6A). Recall that step 710 of FIG. 6A for the view indication subscription processing resulted in caching the following data:

View column:
Cached Values

| Key (view PK) | V_C1 |
|---|---|
| K1 | B1 |
| K2 | B2 |
| K3 | B3 |

The query results for the modified row indicate that the view row having K1 as its PK has been modified. Thus, in step 818, the cached data for V1 . Key=K1, V1 . V_C1=B1 is compared to the query results "K1, BX" and it is determined that the value for V_C1 has been changed from B1 (cached) to BX (reverse query results) thereby indicating to fire a view change/update indication to the client. If the comparison in step 818 determines that there has been a view change/update, steps 820, 822 and 824 are performed. Otherwise, there is no view change/update indication fired and no need to update the cache. In step 820, an update/change indication is fired by PP manager 112 to the IM 110. In response the IM 110 sends 824 the view update/indication notification to the client 102. In step 822, the cache is updated to include the changed data value BX replacing the old cached value B1. It should be noted that a determination as to whether a property value of interest in the view table has been modified is based on whether the view property value in a particular view row has been modified (e.g., pairing or association of view PK and property value of interest).

Step 824 is similar to step 524 of FIG. 5B with the difference that the notification in 824 is for view change/update. In step 824, the IM 110 fires a view change/update notification to the client 102 for the view V1 indicating the changed view row identified by the changed row's corresponding PK (e.g., V1 . Key=K1) and the changed data value BX (e.g., V1 . V_C1 in the changed row with PK=K1). The client may then perform processing to update the identified row from the virtual table V1.

In connection with the change/update view indication, the foregoing may be applied at an object or class level as well. In connection with the foregoing processing for updating cache 111 of FIG. 3A with respect to indication processing for view delete, new and update/change, the cache 111 may be updated once per polling period. Multiple changes to the cache may have occurred during a single polling period such as due to multiple database operations being performed. The multiple cache changes may be aggregated or combined into a single transaction to update the cache once per polling period.

It should be noted that the information included in an indication or notification may vary with embodiment. For example, in an embodiment in accordance with an client object model standard, the standard may specify the information included in the different indication notifications. For example, when a client is registered to receive an indication notification when an object has changed, a notification is transmitted if any attribute value of the object has changed. The notification may be required by the standard to identify all current attribute values of the object even if only a single attribute values has changed. In an embodiment in accordance with techniques herein, subscription requests from the client and also indications fired to the client by the IM 110 may be specified in terms of the client data model using, for example, view or virtual table names, view columns or properties, and the like.

Figure 7:
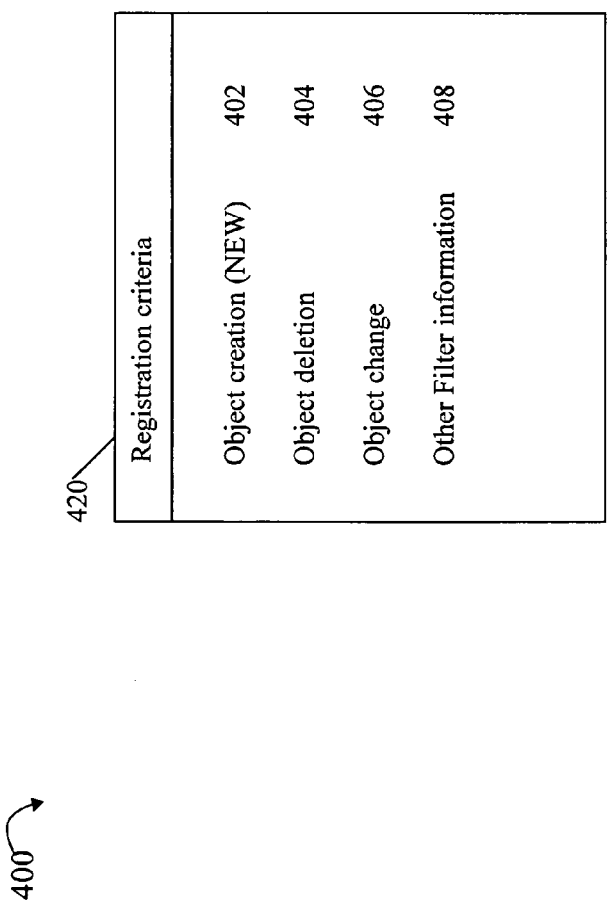
FIG. 7 is an example representation of view registration criteria as may be used in an embodiment in accordance with techniques herein.

Referring to FIG. 7, shown is an example representation of information that may be stored in connection with registration criteria in an embodiment in accordance with techniques herein. The example 400 includes a table of information 420 that may collectively represent all registered views, data elements and other registration criteria such as may be used by IM 110 in connection with performing view indication notification processing. In one embodiment, the criteria 420 may identify registered views and registered data elements of the different views in connection with other information used in determining whether to generate a view indication notification for the registered data elements. For example, the criteria 420 may identify a view and an object, attribute, and/or class of the client or view object data model and particular operations with respect to the foregoing. The criteria may identify, for example, whether notifications are generated when an object of a view is created 402 (e.g., criteria may also specify to generate an indication notification when any object is created, or when an object of a specified class is created), when an object of view is deleted 404 (e.g., criteria may also specify to generate an indication notification when any object is deleted, when a named object is deleted, or when an object of a specified class is deleted), when an object of the view is updated/changed 406 (e.g., criteria may also specify to generate an indication notification when any attribute of any object has a changed data value, when any attribute of a named object has a changed data value, when one or more specified attributes of a named object are changed, or when any object of a specified class has an attribute value changed), and possibly other filter information 410. In an embodiment, the registered views and other information included in the criteria 420 may take any one or more suitable forms such as, for example, a list or other data structure of objects, attributes and/or classes.

As described above as a result of performing registration processing, the registration criteria 420 may identify registered views, clients using such views, and registered data elements of a view as used by the client. The indication cache 111 may be selectively populated to include values of the registered data elements and primary keys of registered views at view indication subscription/registration time as described above.

Figure 8:
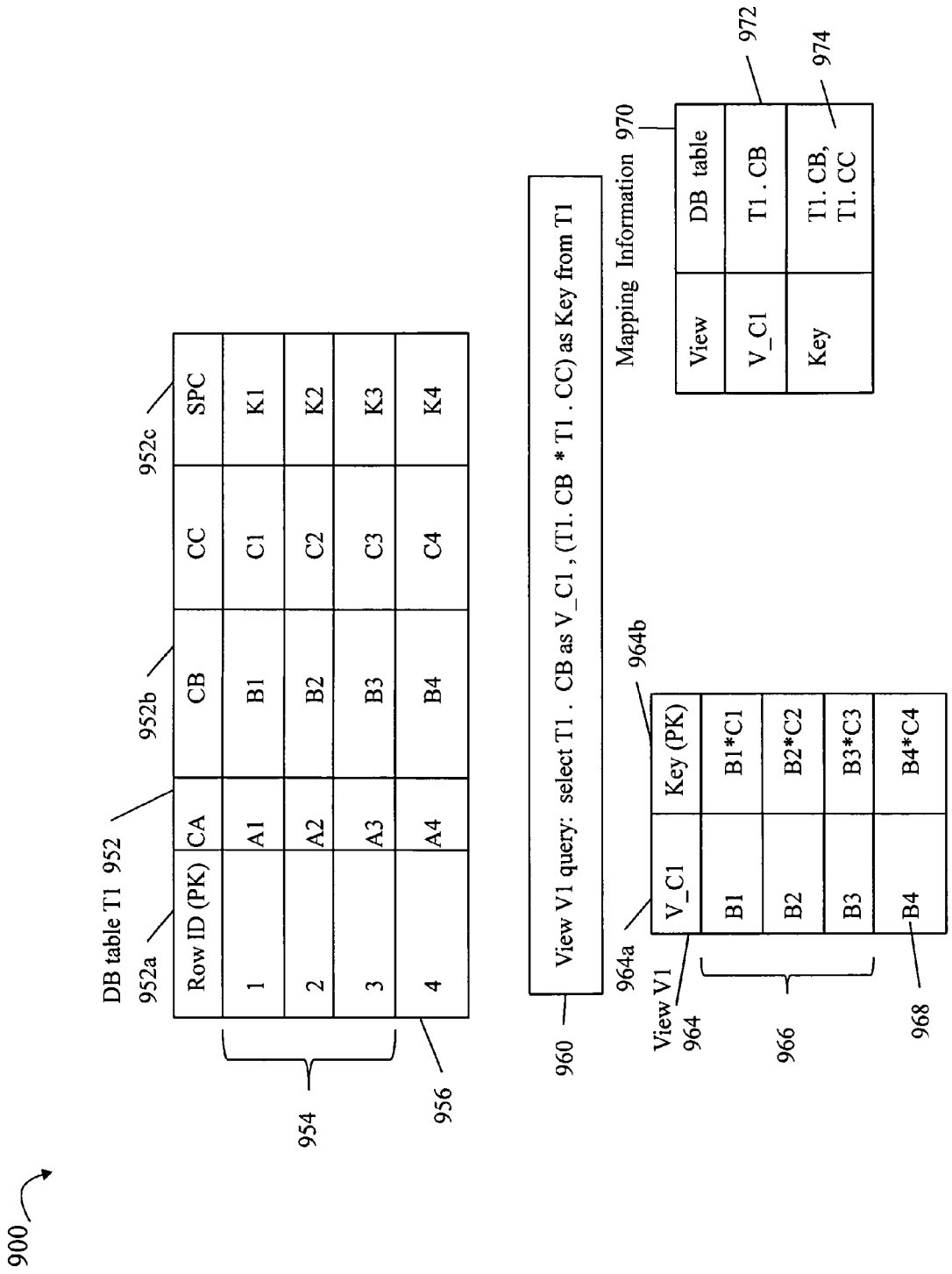

The examples described above in connection with illustrating view indication management are relatively simple examples. As will be appreciated by those skilled in the art, the foregoing techniques may be readily extended to more complex examples. As another example, reference is made to FIG. 8 which is a slightly more complex variation of the example illustrated in FIG. 3A. FIG. 8 includes database table T1 952, view or virtual table query 960, view or virtual table 964 and mapping information 970.

The example 900 of FIG. 8, is similar to that as described above in connection with FIG. 3A with the difference that each property value in the PK view or virtual table column V1 . Key is a mathematical calculation, the product, of two database table values of T1 952 (thereby dependent on multiple values in multiple columns of the database table T1). In particular as represented in the query 960 to generate the virtual table and the column Key of virtual table or view 964, each property value of V1 . Key is the product of two database table property values in T1 . CB and T1 . CC. The foregoing dependency between the V1 . Key and T1 . CB and T1 . CC is indicated in the query 960, column Key 964b of the virtual table 964, and the mapping information 970 (e.g, by element 974). To further illustrate the example of FIG. 8 and processing performed in connection with FIGS. 4A, 4B, 5A and 5B, let 954 of T1 and let 966 of V1 represent the content of each at a first point in time when new subscription processing of FIG. 4A is performed. Following description is similar to that as described above with additional details provided for particular steps of interest for the example of FIG. 8. With reference to FIG. 4A for this example of FIG. 8, step 210 processing caches the key column values of V1 . key 964b for the three rows of V1. It is assumed that each represented quantity in 964b by the product of the denoted variables is unique thereby each resulting in a different row in the virtual table 964. In this case, PP manager 112 performs processing to determine the mathematical product of 964b and may perform other more complex processing as may vary with the particular use of the techniques herein. Step 216 sets update triggers on T1 . CB and T1 . CC since V1 . Key depends on both of these columns of T1.

With reference now to FIG. 4B and FIG. 8, after new subscription processing is complete, row 956 is added to T1 resulting in firing an indication as in step 302 with the RowID=4 as the newly added row to T1. The mapping information 970 is used in steps 308, 310 and indicates that view V1 964 is affected by this newly added row to T1. At step 312, the reverse query may be:

select T1 . CB as V_C1, (T1. CB*T1 . CC) as Key from T1
  WHERE RowID=4 which returns as query results the data represented by 968 of FIG. 8. As above, it is assumed that each represented quantity in 964b by the product of the denoted variables is unique thereby each resulting in a different row in the virtual table 964 (e.g., V1 now has 4 rows represented by 966 and 968, the newly added row). As a result, steps 320 and 322 cause a new notification to be fired to the client using V1 with the new V1 key=B4*C4.

Figure 9:
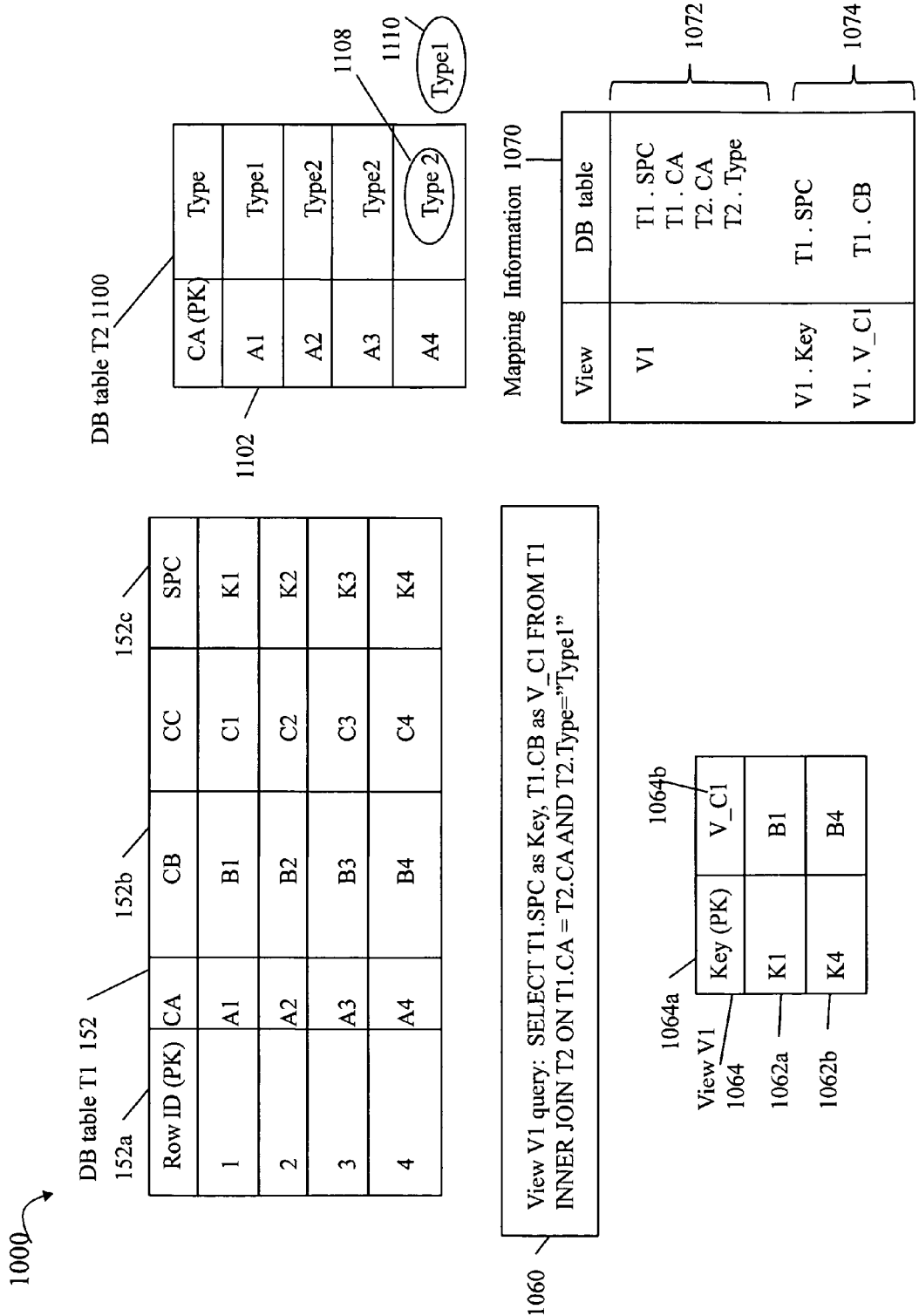

As yet another example, reference is made to FIG. 9 which is also an example of a more complex variation of the example illustrated in FIG. 3A. FIG. 9 includes database tables T1 152 and T2 1100, view or virtual table query 1060, view or virtual table 1064 and mapping information 1070. The table T1 is as described above. The table T2 is an additional database table and the query 1060 is executed to generate a view that inner joins rows of database tables T1 and T2 where T1 . CA and T2 . CA are the same or equal values and where T2 . Type="Type1" as indicated by the inner join clause of the query.

Generally, a JOIN clause as may be used in connection with a database query or command combines records (e.g. rows or entries) from two or more database tables resulting in a set that can be saved as a table or used as is. A JOIN is a means for combining fields from two tables by using values common to each. An INNER JOIN creates a new result table by combining column values of two tables (e.g. T1 and T2) based upon the join-predicate. The query compares each row of T1 with each row of T2 to find all pairs of rows which satisfy the join-predicate. When the join-predicate is satisfied, column values for each matched pair of rows of T1 and T2 are combined into a result row. The result of the join can be defined as the outcome of first taking the Cartesian product (e.g. intersection or cross join) of all records in the tables (combining every record in table T1 with every record in table T2). All records which satisfy the join predicate are returned. The From clause of the Select statement of 1060 (e.g., FROM T1 INNER JOINT T2) lists the tables to be joined. The remaining portion of 1060 beginning with the keyword "ON" (e.g. ON T1.CA=T2.CA AND T2.Type="Type1") specifies the predicate or criteria which must be satisfied using the ON keyword. For the matching joined table entry generated as row of V1 from the query 1060 results, T1. SPC and T1. CB of 1060 denote the properties of T1 which are extracted and mapped to corresponding columns Key and V_C1 of the view V1. The two database tables that are INNER JOINed are T1 and T2 having matching entries meeting the criteria of the ON clause (e.g. ON T1 . CA=T2 . CA AND T2.Type="Type1").

The mapping information 1070 may represent mapping information used in connection with techniques herein in a manner similar to that as described above for mapping information 170 of FIG. 3A to indicate dependencies between the database table(s) and view(s). In this example, element 1070 may include the information of previous mapping table 170 with additional information 1072.

At a first point in time, database tables T1 and T2 include all information as illustrated in FIG. 9. In particular, table T2 has CA column as its PK. Furthermore T2 includes a column Type having only a single row 1102 having a value of T2 . Type="Type1". Therefore, at this first point in time, the view or virtual table V1 includes only row 1062a. At this first point in time, the client may perform new subscription processing for V1 as illustrated in connection with FIG. 4A. With reference to the particular example of FIG. 9, step 208 determines that view V1 is dependent on properties of both tables T1 and T2 using mapping information 1070. Step 210 caches value K1 of V1 . Key. Step 216 results in setting insert, delete and update triggers on T1 and insert, delete and update triggers on T2 due to the dependencies of the view V1 on both database tables T1 and T2. The update triggers set may include setting a trigger on T1. SPC as noted above with FIG. 3A (since PK of V1 depends on this value) and also setting update triggers on T1 . CA, T2 . CA and T2. Type since changes to any of these property values may result in a new row being added to V1. At a second point in time with reference to FIG. 9, let property value 1108 in T2. Type be modified from "Type2" to "Type1" 1110. As will be described below, such an update from 1108 to 1110 in table T2 results in new row 1062b being added to the view V1.

Figure 9B:
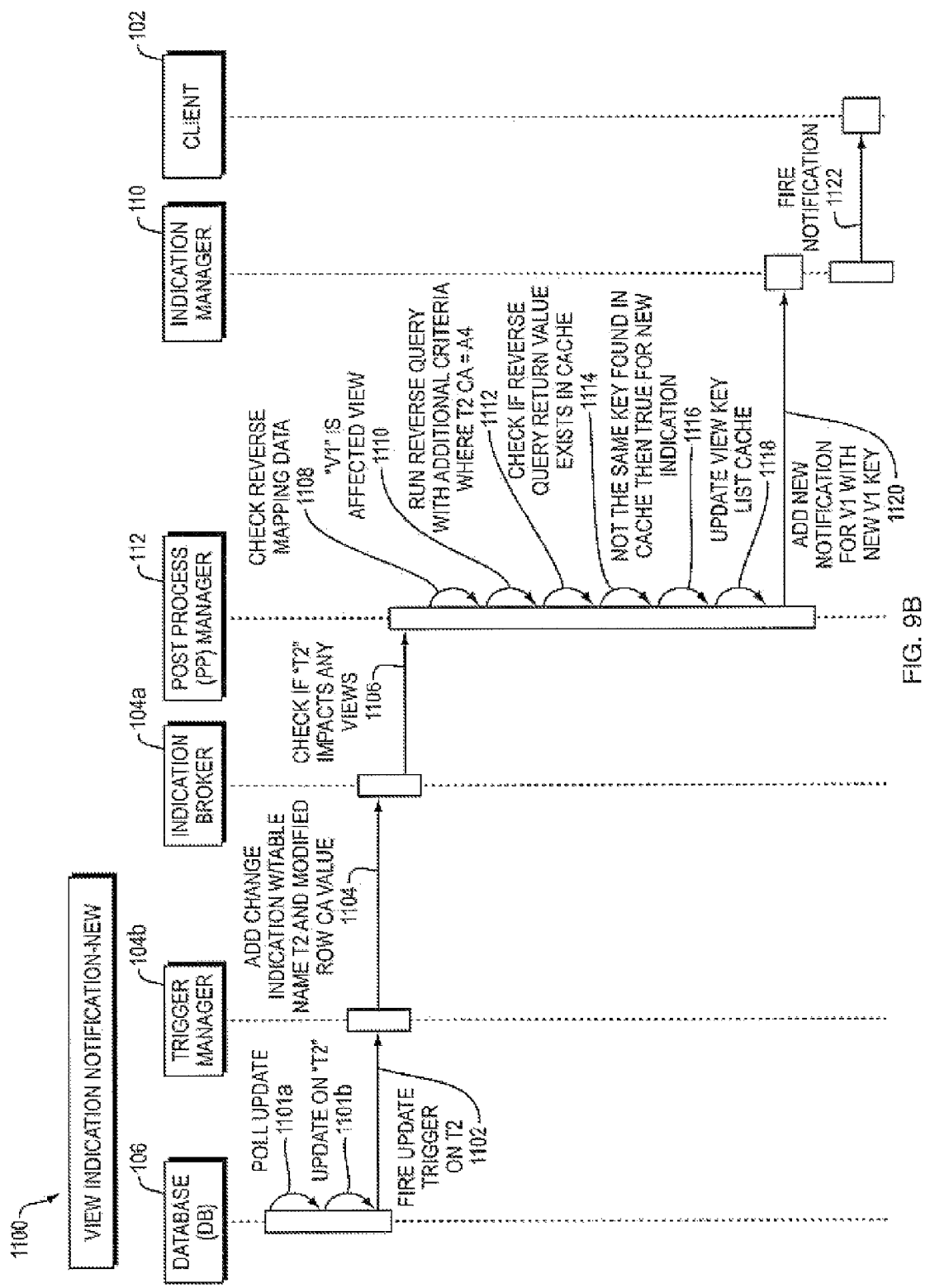

In response to modifying 1108 to 1110 of FIG. 9, reference is now made to FIG. 9B processing. FIG. 9B processing is similar FIG. 4B as described above with the difference that the steps have been customized as variations for the example of FIG. 9. In response to the update as illustrated by 1110, an update/change trigger is fired for T2 in step 1102. In this example of FIG. 9, T2 . C=A4 is updated as communicated in step 1104 from the trigger manager 104b to the indication broker 104a. In step 1106, the indication broker 104a communicates with the PP manager 112 to determine whether T2 impacts any views. In step 1108, the PP manager 112 use the mapping information 1170 to perform reverse mapping and determine which view(s) are affected or dependent on properties of T2. Step 1110 determines that V1 is the affected view. At step 1112, the reverse query is run with additional criteria for the modified row of T2, where T2 . CA=A4 (e.g., additional criteria specified in addition to the original view query is "AND T2.CA=A4" below):
SELECT T1.SPC as Key, T1.CB as V_C1 FROM T1 INNER JOIN T2 ON T1.CA=T2.CA AND T2.Type="Type1" AND T2.CA=A4

The foregoing reverse query returns information represented by 1062b of FIG. 9. In the reverse query results as illustrated by 1062b, V1 . PK value="K4". At step 1114, a comparison is made between "K4" from the reverse query results and the cached one or more values for V1 . Key (e.g., value K1 as cached in connection with new subscription processing described above). At step 1116, it is determined the "K4" is not included in the previously cached list of values which only includes "K1" in this example. At step 1118, the cached list is updated to include both K1 and also K4. At step 1120, the PP manager 112 communicates with the indication manager 110 to add a new notification for V1 with new V1 key, K4 to the list of notifications to be sent to client subscribers. In response, the indication manager 110 fires a new notification in step 1122 to the client indicating that V1 has a new row added with V1 . Key=K4.

It should be noted that rather than use the original query above with inner join syntax, and alternative and equivalent original query using varied syntax that may be used is:
SELECT T1.SPC as Key, T1.CB as V_C1 FROM T1, T2, WHERE T1.CA=T2.CA AND T2.Type="Type1"
With a corresponding reverse mapping query that may be used:
SELECT T1.SPC as Key, T1.CB as V_C1 FROM T1,T2 WHERE T1.CA=T2.CA AND T2.Type="Type1" AND T2.CA=A4

In connection with the above techniques such as in view indication subscription step 216 of FIG. 4A, step 416 of FIG. 5A, and step 716 of FIG. 6A, database triggers are set on insert, delete and update operations of a database table including data value(s) upon which a registered view is dependent. As noted above, even though the client view indication subscription request may be for one type of view indication such as new which adds a row to the view or virtual table, the techniques herein set database triggers for database tables upon which the view is dependent for new as well as delete and update database triggers. This is performed due to the variation in dependencies between database tables and views so that, for example, a new operation which adds a row to a database tables may result in deleting a row from a view, modifying/updating an existing table of a view, and/or adding a row to a view depending on the particular dependency.

To further illustrate, consider the following view providing summary statistics regarding data storage configuration information. The view may provide summary information regarding a number of HBAs on hosts connected to the data storage system. The view or virtual table V1 used by a client may provide a table of summary information indicating a total number of HBAs per host (HBA count) and a count of the number of hosts (Num hosts) having each particular HBA count. The view primary key may be HBA count and at time t=1, the virtual table V1 may be as follows:

| HBA Count | Num hosts |
|---|---|
| 1 | 1 |
| 2 | 1 |
| 3 | 1 |

The foregoing view V1 may have a definition represented in a pseudo-code like description as follows where V1 may be generated using commands which extract and perform calculations using data from a database table T1:
View "HBA Count per Host"
(Column: HBA Count=auto increment number,
Column: Num Hosts=count of each distinct host id listed in Database Table T1. HostID)

The database table at time t=1 includes records of information with a primary key (PK) based on a unique combination of two columns of T1, the HBA ID and Host ID. Other information may be stored in other columns of database table T1. The database table T1 may have data represented as:

| HBA ID | Host ID | Other information |
|---|---|---|
| HBA A1 | H1 | XXXX |
| HBA B1 | H2 | xxxxx |
| HBA B2 | H2 | xxxxx |
| HBA C1 | H3 | xxxxxx |
| HBA C2 | H3 | xxxxx |
| HBA C3 | H3 | xxxxx |

As with other views or virtual tables described herein, commands such as one or more database query and/or other commands may be used to extract data from T1 and perform operations thereon to generate the summary information of the view V1.

At time t=2, the following record is added (NEW) to the database table T1 above which increases the number of HBAs for host ID H1 from 1 to 2:

| HBA ID | Host ID | Other information |
|---|---|---|
| HBA A2 | H1 | XXXX |

In connection with the techniques herein, assume the client is registered to receive indications for new and delete for V1 and also for an update to any data value in any existing row of V1. In response to the foregoing NEW operation to add a record or row to table T1, the client is notified that the view V1 affected by the new record added to T1. The impact or update to view V1 as a result of adding the above row to T1 is to DELETE the row of V1 where the PK of V1 (e.g. V1 . HBA Count) is 1 and a change/update to the view record having view PK=2 (V1 . HBA Count=2). The revised view is as follows:

| HBA Count | Num hosts |
|---|---|
| 2 | 2 |
| 3 | 1 |

With this, we can also illustrate how deleting a database table row can result in a NEW and CHANGE to the view V1. At time T=3, if the record previously added to the database table T1 at time T=2 is now deleted, the resulting impact to the view V1 is a NEW to add in a new record having a primary view V1 key HBA Count=1 and an update/change to the view V1 row having the primary view key HBA Count=2 where this HBA Count is now decremented to 1. The result is that the view V1 returns to the state as in t=1 above.

The foregoing describes techniques for view indication management including view indication subscription and notification. The view modifications and notifications regarding such modifications may be pushed to the client subsequent to client view registration. The polling as may be performed internally within a data storage system to obtain updated data storage configuration data may be ongoing while data of a view is displayed or otherwise in use by the client for a current session. The techniques herein provide for automated notification to the client regarding any view data changes so that the client may accordingly update the view for the current session in response to any configuration data updates due to polling data collected during the client session. The techniques provide for selectively and efficiently populating the cache in order to detect whether a database table change actually results in a modification to data values currently included in the view so that, for example, the client is not notified regarding a view change if a current data value of the view is not updated to a different data value. The techniques provide for pushing such view notifications to the client rather than having the client perform polling to monitor for any view changes.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for providing notifications comprising:
registering, by a client, a subscription request for a view to provide a notification to the client responsive to a data change affecting the view, wherein the view is generated using one or more commands operating on data included in a database;
performing a first operation to the database;
determining whether the first operation causes a data change affecting the view;
responsive to determining the first operation causes a data change affecting the view, sending a notification from an indication manager to the client thereby pushing the notification to the client regarding the data change without having the client poll for any data changes affecting the view; and
updating the view in response to receiving the notification, wherein the view is accessible as a virtual table computed using one or more database tables of the database, wherein each of the one or more database tables corresponds to a class of object instances, each row of said each database table includes data for one of said object instances, and said each row includes property or attribute values for said one object instance, wherein each object instance identified by a corresponding row in one of the one or more database tables represents any of a physical entity and a logical entity in a data storage system, wherein at least one object represented by a corresponding row in one of the one or more database tables represents a first logical entity that is any of a RAID group, a logical device, and a storage group of one or more logical devices.

2. The method of claim 1, wherein the view is updated using information returned in the notification.

3. The method of claim 1, wherein the one or more commands are database query commands which extract data from the one or more database tables.

4. The method of claim 3, wherein the first operation is a command to perform any of an update operation to update an existing row of a first of the one of the database tables, a new operation to add a new row to the first database table and a delete operation to delete an existing row of the first database table.

5. The method of claim 4, wherein the subscription request includes criteria to register to receive a notification in response to an occurrence of any of a deletion of an existing row from the virtual table representing the view, an update of one or more data items included in an existing row from the virtual table representing the view, and a new operation causing an addition of a new row to the virtual table representing the view.

6. The method of claim 5, wherein the criteria indicates to register to receive a notification in response to any of an occurrence of a deletion of a row from the virtual table of the view and a new operation to add a new row of data to the virtual table of the view, and the method further comprising:
determining that the first database table includes data upon which said view is dependent;
setting one or more database triggers for the first database table, said one or more database triggers providing for notification to a first software component upon an occurrence of any of a new operation to insert a new row in the first database table, a delete operation to delete an existing row from the database table, and an update operation to update a column of the first database table, wherein a primary key of the virtual table of the view is dependent upon the column; and
caching a first set of one or more values for the primary key, said first set of one or more values corresponding to current values of the primary key included in the virtual table of the view.

7. The method of claim 6, wherein the criteria indicates to register to receive a notification in response to an occurrence of a new operation to add a new row of data to the virtual table, and the method further comprising:
receiving a database trigger notification that a new row having a first row identifier has been added to the first database table;
determining that the view has a data dependency on data of the new row;
performing a query based on at least a first of said one or more database query commands with additional query criteria to retrieve data of the first database table matching said first row identifier, said query returning first results;
determining whether the first results includes a first value that does not match one of the values of the first set previously cached; and
if the first results includes the first value that does not match one of the values of the first set, sending a new notification to the client and updating a cache to include the first value.

8. The method of claim 6, wherein the criteria indicates to register to receive a notification in response to an occurrence of a delete operation to delete an existing row of data from the virtual table, and the method further comprising:
receiving a database trigger notification that a first row having a first row identifier has been deleted from the first database table;
determining that the view has a data dependency on data of the first row that has been deleted;
performing a query based on at least a first of said one or more database query commands to return first results including a list of one or more current values of the primary key of the virtual table of the view;
comparing the list to the first set previously cached; and
for each value included in the first set which does not have a match in the list, sending a deletion notification to the client and updating a cache to remove said each value.

9. The method of claim 5, wherein the criteria indicates to register to receive a notification in response to an occurrence of an update or change operation to update any existing data included in a first column of the virtual table of the view, wherein the first column corresponds to an object property of interest, and the method further comprising:
determining that the first database table includes data upon which said view is dependent;
determining a second column of the first database table, wherein the first column of the virtual table of the view corresponds to or otherwise depends upon the second column;
setting one or more database triggers for the first database table, said one or more database triggers providing for notification to a first software component upon an occurrence of any of an insert operation to insert a new row in the first database table, a delete operation to delete an existing row from the database table, an update operation to update the second column of the first database table, and an update operation to update a column of the first database table, wherein a primary key of the virtual table of the view depends on the column;
caching a first set of one or more values for the primary key of the virtual table of the view, said first set of one or more values corresponding to current values of the primary key included in the virtual table of the view; and
caching a second set of one or more values of the first column of the virtual table, said second set of one or more values corresponding to current values included in the first column of the virtual table, each value in said second set having a corresponding value in said first set.

10. The method of claim 9, further comprising:
receiving a database trigger notification that a first database operation has been performed to update existing data of a first row having a first row identifier from the first database table;
determining that the view has a data dependency on data of the first row;
performing a query based on at least a first of said one or more database query commands with additional query criteria to retrieve data of the first database table matching said first row identifier, said query returning first results corresponding to a second row of the virtual table dependent on the first database operation performed, said first results including a first primary key value for the primary key of the virtual table and a first property value of the object property of interest;
comparing the first results to the first set and the second set to determine if there has been a change to any one or more values of the object property of interest; and
for each value included in the second set that is associated with a corresponding value in the first set and that is identified as having changed by said comparing, sending a change notification to the client and updating a cache to include an updated data value for said each value.

11. The method of claim 3, wherein the one or more commands include at least one command which aggregates first data from the one or more database tables and includes in the view one or more data items in accordance with the aggregated first data.

12. The method of claim 11, wherein the first data includes a mathematical calculation using a plurality of data items from the one or more database tables.

13. The method of claim 11, wherein the one or more commands include at least one command which joins data from multiple database tables to form a row of the virtual table of the view.

14. A non-transitory computer readable medium comprising code stored thereon for providing notifications, the non-transitory computer readable medium comprising code for:
registering, by a client, a subscription request for a view to provide a notification to the client responsive to a data change affecting the view, wherein the view is generated using one or more commands operating on data included in a database;
performing a first operation to the database;
determining whether the first operation causes a data change affecting the view;
responsive to determining the first operation causes a data change affecting the view, sending a notification from an indication manager to the client thereby pushing the notification to the client regarding the data change without having the client poll for any data changes affecting the view; and
updating the view in response to receiving the notification wherein the view is accessible as a virtual table computed using one or more database tables of the database, wherein each of the one or more database tables corresponds to a class of object instances, each row of said each database table includes data for one of said object instances, and said each row includes property or attribute values for said one object instance, wherein each object instance identified by a corresponding row in one of the one or more database tables represents any of a physical entity and a logical entity in a data storage system, wherein at least one object represented by a corresponding row in one of the one or more database tables represents a first logical entity that is any of a RAID group, a logical device, and a storage group of one or more logical devices.

15. The non-transitory computer readable medium of claim 14, wherein the one or more commands are database query commands which extract data from the one or more database tables.

16. The non-transitory computer readable medium of claim 15, wherein the first operation is a command to perform any of an update operation to update an existing row of a first of the one of the database tables, a new operation to add a new row to the first database table and a delete operation to delete an existing row of the first database table.

* * * * *